(12) United States Patent
Su et al.

(10) Patent No.: US 8,401,247 B2
(45) Date of Patent: Mar. 19, 2013

(54) IMAGE PROCESSING APPARATUS, BIOMETRIC AUTHENTICATION APPARATUS, IMAGE PROCESSING METHOD AND RECORDING MEDIUM

(75) Inventors: Leiming Su, Tokyo (JP); Yukio Hoshino, Kanagawa (JP); Yukio Itakura, Kanagawa (JP)

(73) Assignee: NEC Corporation, Tokyo (JP)

( * ) Notice: Subject to any disclaimer, the term of this patent is extended or adjusted under 35 U.S.C. 154(b) by 59 days.

(21) Appl. No.: 13/143,445

(22) PCT Filed: Jan. 22, 2010

(86) PCT No.: PCT/JP2010/050834
§ 371 (c)(1),
(2), (4) Date: Jul. 6, 2011

(87) PCT Pub. No.: WO2010/084967
PCT Pub. Date: Jul. 29, 2010

(65) Prior Publication Data
US 2011/0280454 A1    Nov. 17, 2011

(30) Foreign Application Priority Data

Jan. 22, 2009  (JP) .................................. 2009-012422

(51) Int. Cl.
*G06K 9/00* (2006.01)
(52) U.S. Cl. ........................................................ 382/117
(58) Field of Classification Search .................... None
See application file for complete search history.

(56) References Cited

FOREIGN PATENT DOCUMENTS

| JP | 10-275234 A | 10/1998 |
|---|---|---|
| JP | 3307936 B | 7/2002 |
| JP | 2003317102 A | 11/2003 |

OTHER PUBLICATIONS

International Search Report for PCT/JP2010/050834 mailed Mar. 9, 2010.

*Primary Examiner* — Stephen R Koziol
*Assistant Examiner* — Amandeep Saini

(57) ABSTRACT

A region of an iris image where eyelash and other part images are mixed is identified with accuracy. The noise region of an iris image contained in a digital eye image (P1) where, for example, eyelash and eyelid parts are mixed is identified with accuracy based on characteristic curves obtained by scanning the iris image with arcs (AR1) and (AR2). Then, authentication is performed using data created based on the iris image from which the noise region is excluded. In this way, the subject can be authenticated with accuracy without being affected by noise.

11 Claims, 24 Drawing Sheets

IMAGE PROCESSING APPARATUS, BIOMETRIC AUTHENTICATION APPARATUS, IMAGE PROCESSING METHOD AND RECORDING MEDIUM

The present application is the National Phase of PCT/JP2010/050834, filed Jan. 22, 2010, which is based on the Japanese Patent Application No. 2009-012422 filed on Jan. 22, 2009, of which the specification, scope of claims, and figures are all incorporated herein by reference.

TECHNICAL FIELD

The present invention relates to an image processing apparatus, biometric authentication apparatus, image processing method, and recording medium and particularly to an image processing apparatus for processing digital eye images, a biometric authentication apparatus for authentication by the iris pattern, an image processing method for processing digital eye images, and a computer-readable recording medium on which recorded are programs allowing a computer to execute processing of digital eye images.

BACKGROUND ART

Recently, extensive efforts have been made in research and development of biometric authentication technology for authentication by a physical feature of the subject in place of codes or passwords consisting of a combination of characters and symbols. In biometric authentication, physical features that are never identical between individuals, such as one's fingerprint, vein pattern on the back of a hand, iris pattern, and vocal print, are usually utilized. Particularly, as authentication apparatuses utilizing fingerprints or vein patterns on the back of one's hand have been improved in the accuracy of authentication and reduced in cost, they are installed in various devices such as ATMs (automatic teller machines) and personal computers (PCs).

However, authentication by the fingerprint or vein pattern on the back of a hand requires the subject to make a part of his/her body, a finger or a hand, contact with the apparatus or place it close to the apparatus to a certain extent. For this reason, recently, authentication by the iris pattern has drawn attention (for example, see Patent Literature 1).

PRIOR ART LITERATURE

Patent Literature

Patent Literature 1: Japanese Patent Publication No. 3307936.

DISCLOSURE OF INVENTION

Problem to be Solved by the Invention

The irises is exposed between the upper and lower eyelids. When one is in a natural state, the irises are generally covered by the upper and lower eyelids in part. Therefore, for authentication by the iris pattern, an image of the iris exposed between the eyelids has to be identified in a digital eye image with accuracy. Furthermore, although there are individual differences, an iris image and an eyelash part image are mixed when the eyelashes on the eyelid protrude over the exposed iris. In such a case, it is necessary to remove a region where an eyelash part image is mixed from an iris image with accuracy and use the remaining region effectively for authentication.

The present invention is invented in view of the above circumstances and an exemplary object of the present invention is to provide an image processing apparatus and the like enabling accurate authentication using an iris image.

Means for Solving the Problem

The image processing apparatus according to a first exemplary aspect of the present invention is an image processing apparatus for detecting noise in a digital image of an eye, comprising a calculation part calculating the average brightness value of each of multiple pixels in the digital image overlapping with a curve having a shape substantially conforming to the rim of the eyelid of the eye at each position of the curve while moving the curve from near the center of the pupil of the eye to the eyelid on the digital image; and an identifying part identifying the position of noise contained in an image of the iris in the digital image based on the degree of change in the average brightness value at the position.

The biometric authentication apparatus according to a second exemplary aspect of the present invention is a biometric authentication apparatus for authentication by the pattern of an iris, comprising an imaging unit capturing a digital eye image; and the image processing apparatus according to the present invention for identifying the position of noise contained in an image of the iris in the digital eye image.

The image processing method according to a third exemplary aspect of the present invention is an image processing method for detecting noise in a digital image of an eye, comprising a step of calculating the average brightness value of each of multiple pixels in the digital image overlapping with a curve having a shape substantially conforming to the rim of the eyelid of the eye at each position of the curve while moving the curve from near the center of the pupil of the eye to the eyelid on the digital image; and a step of identifying the position of noise contained in a digital image of the iris in the digital image based on the degree of change in the average brightness value at the position.

The recording medium according to a fourth exemplary aspect of the present invention records programs that allow a computer to function as a calculation means calculating the average brightness value of each of multiple pixels in a digital image of an eye overlapping with a curve having a shape substantially conforming to the rim of the eyelid of the eye at each position of the curve while moving the curve from near the center of the pupil of the eye to the eyelid on the digital eye image; and an identifying means identifying the position of noise contained in a digital image of the iris in the digital image based on the degree of change in the average brightness value at the position.

EFFECT OF THE INVENTION

The present invention can identify a region where an iris image and an eyelash part image are mixed with accuracy, thereby allowing for accurate authentication using an iris image.

BEST MODE FOR CARRYING OUT THE INVENTION (Embodiment 1)

Figure 1:
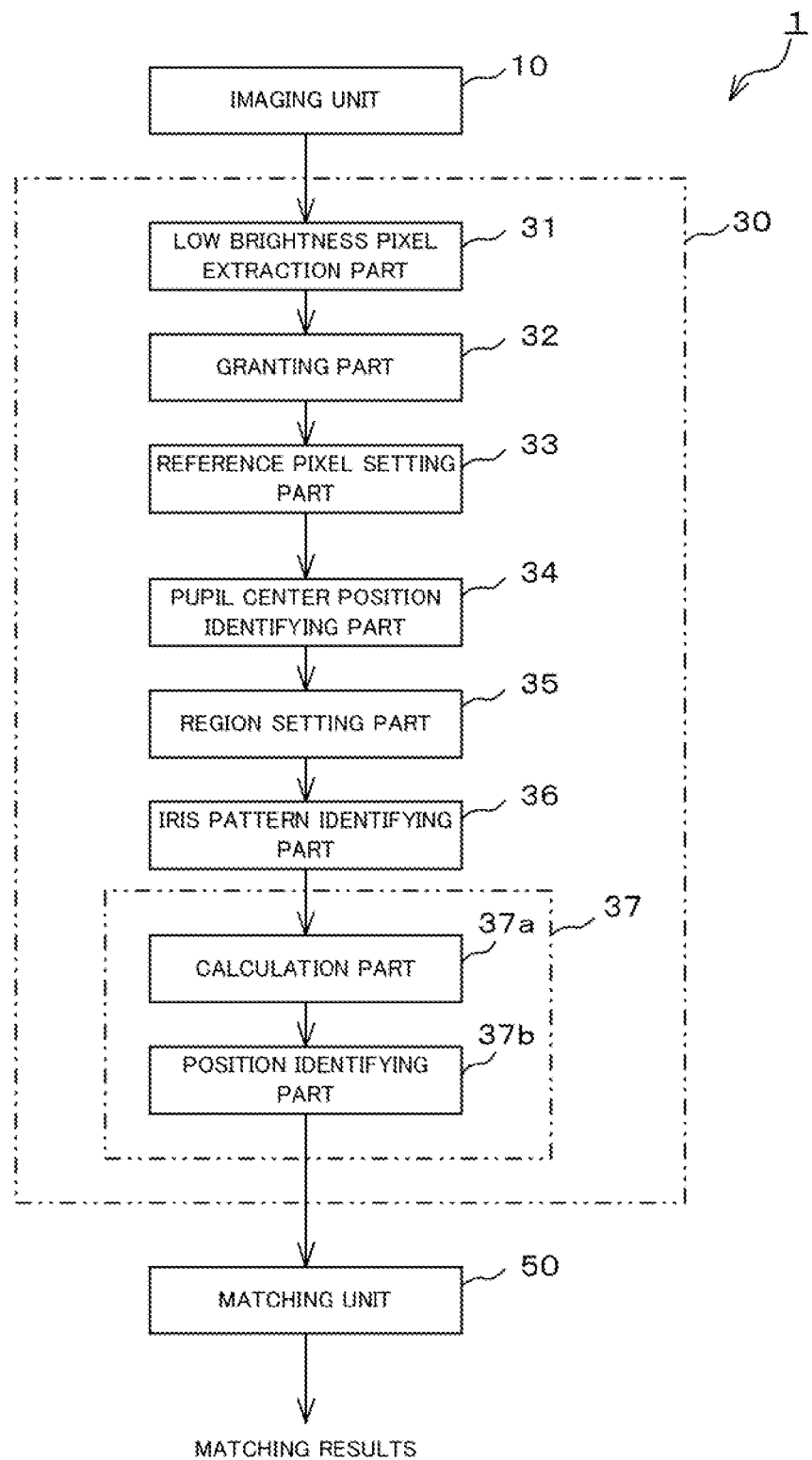
[FIG. 1] A block diagram showing the general configuration of a biometric authentication apparatus according to Embodiment 1 of the present invention.

Embodiment 1 of the present invention will be described hereafter with reference to FIGS. 1 to 22. FIG. 1 is a block diagram showing the general configuration of a biometric authentication apparatus 1 according to this embodiment. The biometric authentication apparatus 1 performs authentication by the iris pattern of the subject. The biometric authentication apparatus 1 comprises an imaging unit 10, an image processing unit 30, and a matching unit 50.

Figure 2:
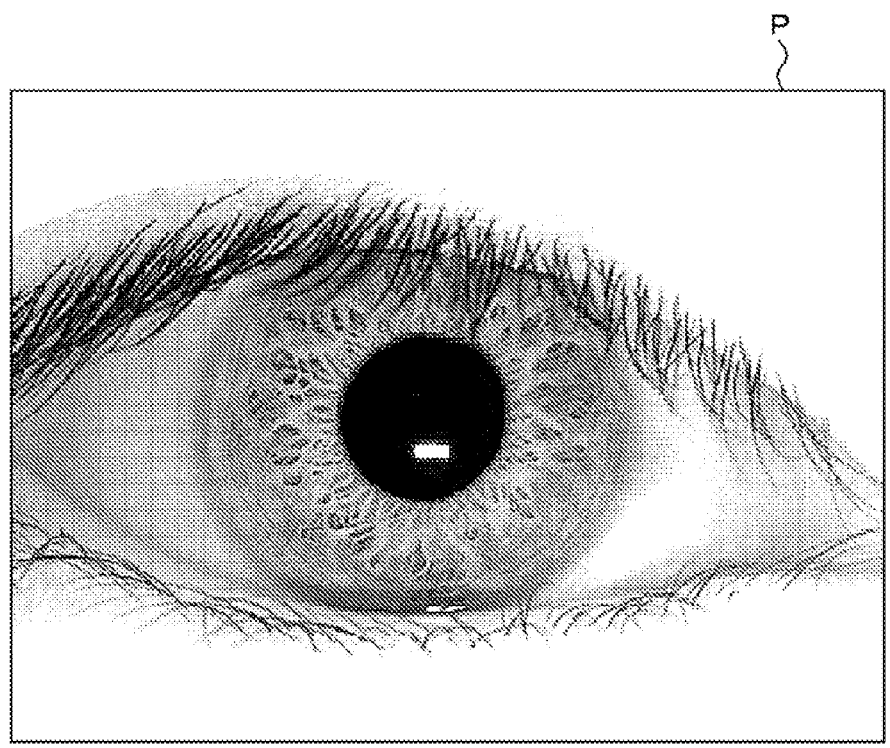
[FIG. 2] An illustration showing a digital image.

The imaging unit 10 comprises an infrared camera having an illumination device emitting illumination light including, for example, near infrared light and an infrared filter cutting off visible light other than infrared light. The imaging unit 10 outputs a digital image obtained by imaging an eye of the subject to the image processing unit 30. FIG. 2 shows a digital image P as an exemplary digital image captured by the imaging unit 10. As seen from FIG. 2, the imaging unit 10 captures an image including at least an iris and surrounding eyelids and eyelashes of the subject. Furthermore, since the imaging unit 10 performs infrared imaging, the digital image P is a gray-scale image.

Figure 3:
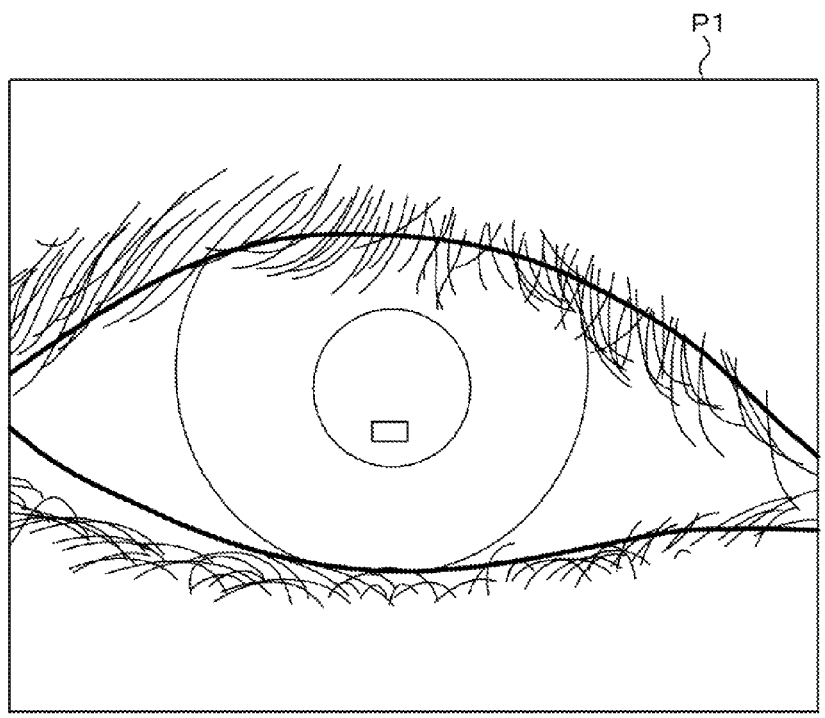
[FIG. 3] An illustration showing an image obtained by simplifying a digital image.

An image P1 shown in FIG. 3 is an image obtained by simplifying the digital image P to present the iris and surrounding parts in outline. For the purpose of convenience, the following explanation will be made using a digital image P and an image P1 corresponding to the digital image P where necessary.

Returning to FIG. 1, the image processing unit 30 has a low brightness pixel extraction part 31, a granting part 32, a reference pixel setting part 33, a pupil center position identifying part 34, a region setting part 35, an iris pattern identifying part 36, and a noise region identifying part 37.

Figure 4:
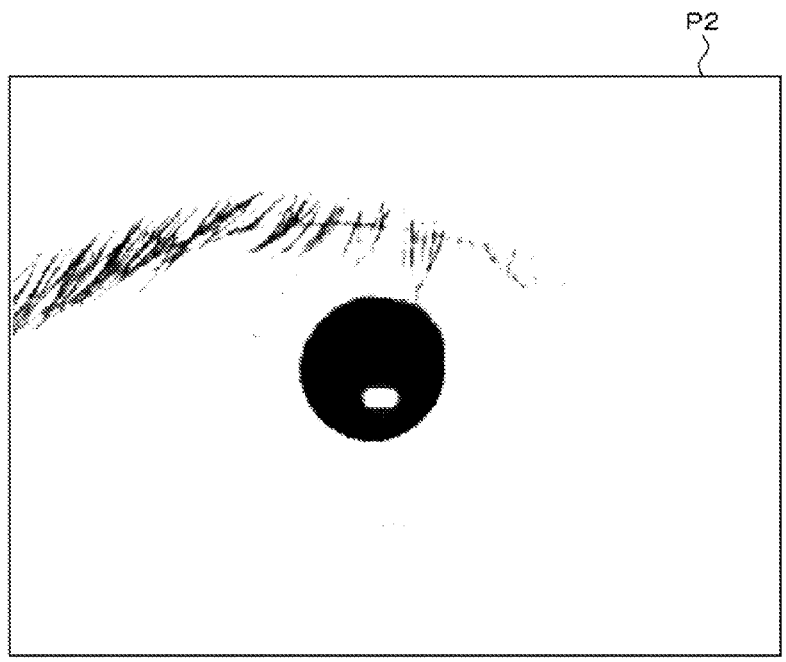
[FIG. 4] An illustration showing a binary image.

The low brightness pixel extraction part 31 extracts low brightness pixels having brightness equal to or lower than a given threshold among multiple pixels constituting a digital image P output from the imaging unit 10. The low brightness pixels are extracted, for example, by converting the digital image P to a binary image and extracting the pixels having brightness of 0 in the binary image. For example, FIG. 4 shows a binary image P2 obtained by image conversion of the digital image P using a given threshold. The low brightness pixel extraction part 31 extracts low brightness pixels constituting the black parts in the binary image P2 shown in FIG. 4 and outputs information containing the extraction results to the granting part 32. Here, the threshold used by the low brightness pixel extraction part 31 can be determined according to the imaging conditions of the digital image P. In this embodiment, the threshold is determined so that the pixels constituting an iris image appear as high brightness pixels and the pixels constituting a pupil image appear as low brightness pixels in the binary image P2. With the threshold being determined as just described, the pixels mainly constituting images of the pupil and eyelashes appear as low brightness pixels in the binary image P2.

The granting part 32 selects the low brightness pixels extracted by the low brightness pixel extraction part 31 in sequence and grants, for example, a value "1" to multiple pixels within a given distance from the selected low brightness pixel. The operation of the granting part 32 will be described hereafter with reference to FIG. 5 showing a sample image SAMP1.

Figure 5:
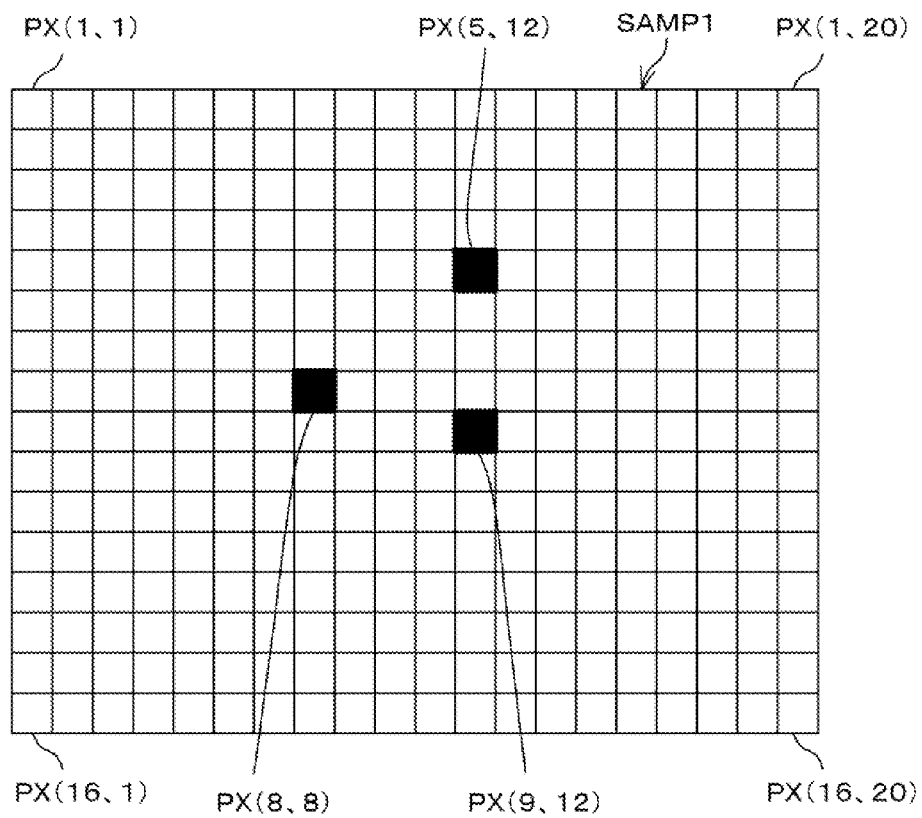
[FIG. 5] An illustration showing a sample image.
Figure 6A:
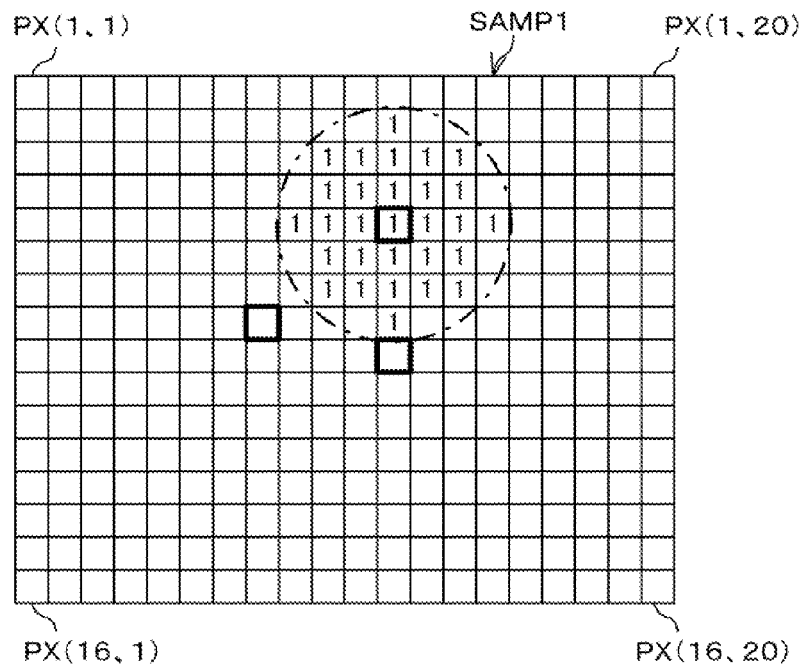
[FIG. 6A] An illustration for explaining the operation of the granting part (Part 1)
Figure 6B:
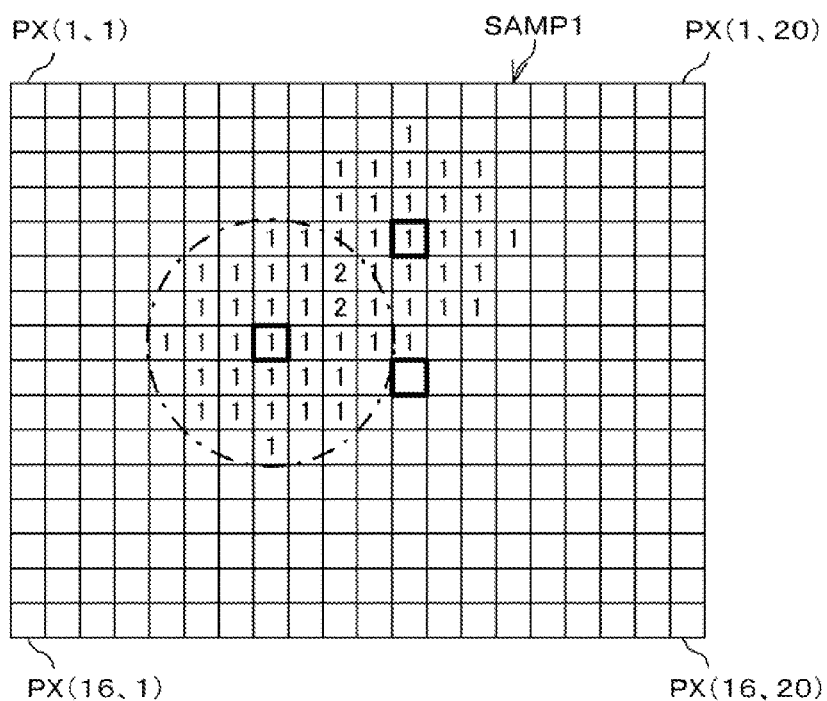
[FIG. 6B] An illustration for explaining the operation of the granting part (Part 2)
Figure 7:
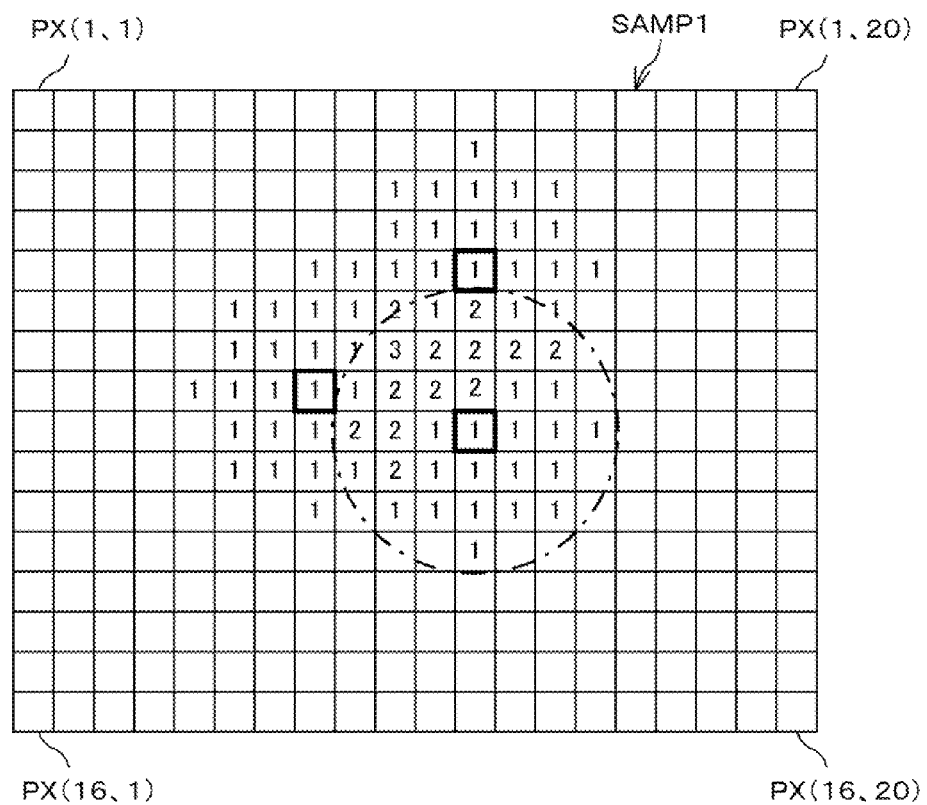
[FIG. 7] An illustration for explaining the operation of the granting part (Part 3)

As shown in FIG. 5, the sample image SAMP1 is an image consisting of pixels PX (m, n) arranged in a matrix of 16 rows and 20 columns by way of example. Here, m is an integer from 1 to 16 indicating the row number and n is an integer from 1 to 20 indicating the column number. The image SAMP1 is a binary image consisting of three low brightness pixels PX (5, 12), PX (8, 8), and PX (9, 12) and the other high brightness pixels PX. The low brightness pixel extraction part 31 extracts the three low brightness pixels PX (5, 12), PX (8, 8), and PX (9, 12). The granting part 32 first selects the low brightness pixel PX (5, 12) in the row 5. Then, as seen from FIG. 6A, the granting part 32 grants "1" to the low brightness pixel PX (5, 12) and pixels PX (m, n) within a given distance from the low brightness pixel PX (5, 12).

Then, the granting part 32 selects the low brightness pixel PX (8, 8) in the row 8. Then, as seen from FIG. 6B, the granting part 32 grants "1" to the low brightness pixel PX (8, 8) and pixels PX within a given distance from the low brightness pixel PX (8, 8). Here, the pixel PX (6, 10) in the row 6 and the pixel PX (7, 10) in the row 7 are within a given distance from each of the low brightness pixels PX (5, 12) and PX (8, 8). Therefore, the granting part 32 accumulates the values granted to these pixels PX (6, 10) and PX (7, 10). Here, after such processing is completed, the pixels PX (6, 10) and PX (7, 10) have an accumulated granted value "2".

Then, The granting part 32 selects the low brightness pixel PX (9, 12) in the row 9. Then, as seen from FIG. 7, the granting part 32 grants "1" to the low brightness pixel PX (9, 12) and pixels PX (m, n) within a given distance from the low brightness pixel PX (9, 12). Here, the pixel PX (7, 10) in the row 7 is within a given distance from each of the low brightness pixels PX (5, 12), PX (8, 8), and PX (9, 12). Therefore, the granting part 32 accumulates the values granted to the pixel PX (7, 10). Here, after such processing is completed, the pixel PX (7, 10) has an accumulated granted value "3." The granting part 32 executes the above processing on all low brightness pixels contained in the image. Consequently, an accumulated granted value is calculated for each pixel PX (m, n).

Figure 8:
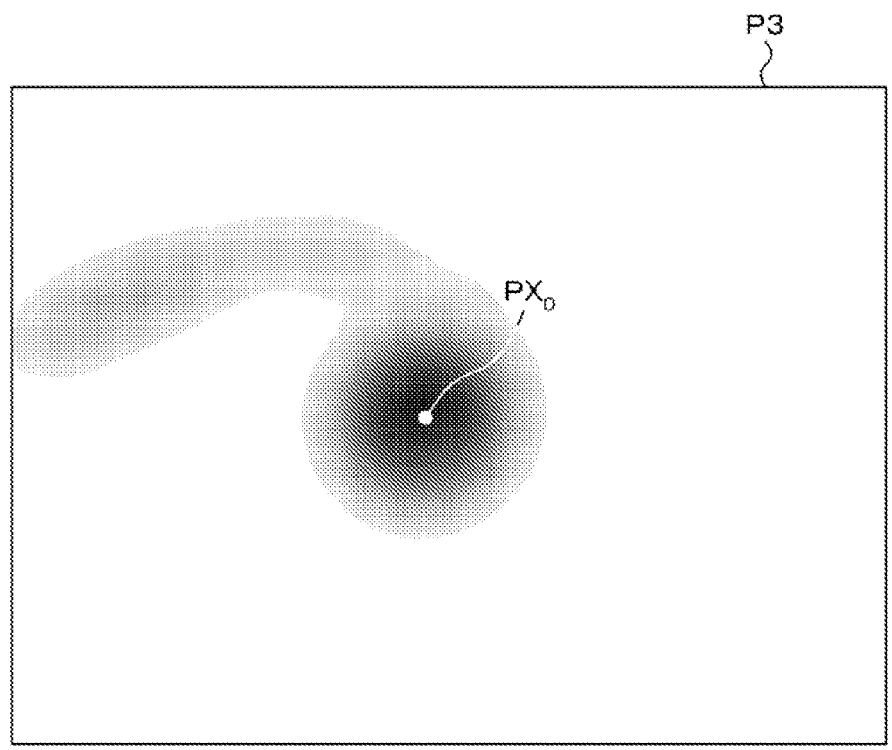
[FIG. 8] An illustration showing an image obtained through the processing by the granting part.

In the image processing unit 30, the granting part 32 executes the above processing on the low brightness pixels constituting the binary image P2. FIG. 8 shows an image P3 as an exemplary image conceptually showing the results of the above processing executed by the granting part 32 on the low brightness pixels constituting the black parts of the binary image P2. In the image P3, the pixels to which higher accumulated values are granted by the granting part 32 appear in higher density colors. The granting part 32 outputs the results of the above processing to the reference pixel setting part 33.

Figure 9:
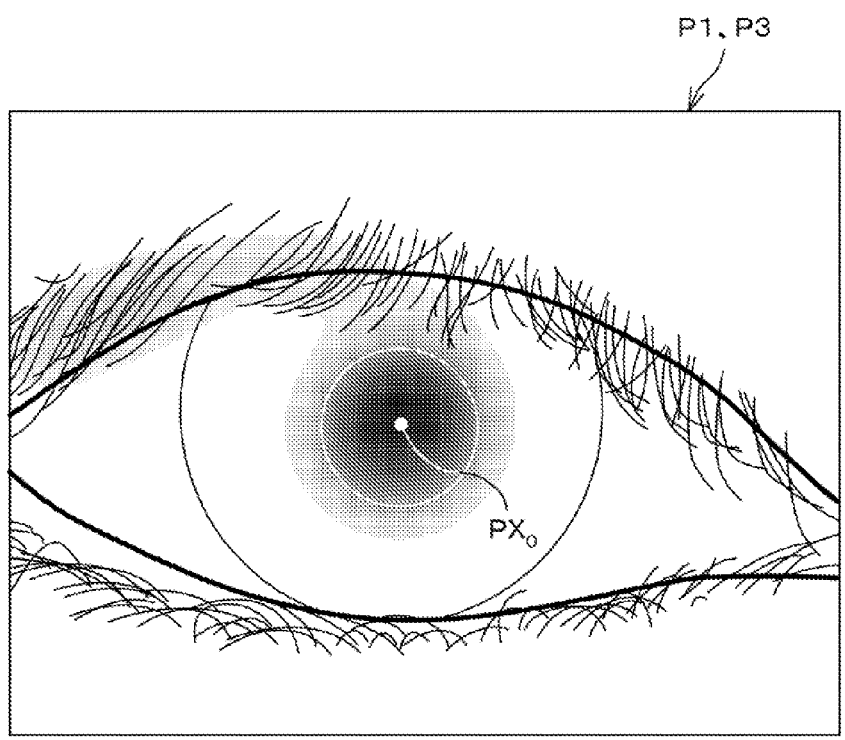
[FIG. 9] An illustration for explaining the processing results of the granting part.

The reference pixel setting part 33 sets the pixel having the highest accumulated granted value as a reference pixel $PX_0$ and outputs the position information of the reference pixel $PX_0$ to the pupil center position identifying part 34. As shown in FIG. 8, the reference pixel $PX_0$ is at the same position as the pixel presented with the highest density in the image P3. Furthermore, FIG. 9 shows an image in which the image P1 (see FIG. 3) is superimposed on the image P3 (see FIG. 8) (namely an image for explaining the results of the processing of the granting part 32). As shown in FIG. 9, the reference pixel $PX_0$ is located nearly at the center of the pupil shown in the image P1.

Figure 10:
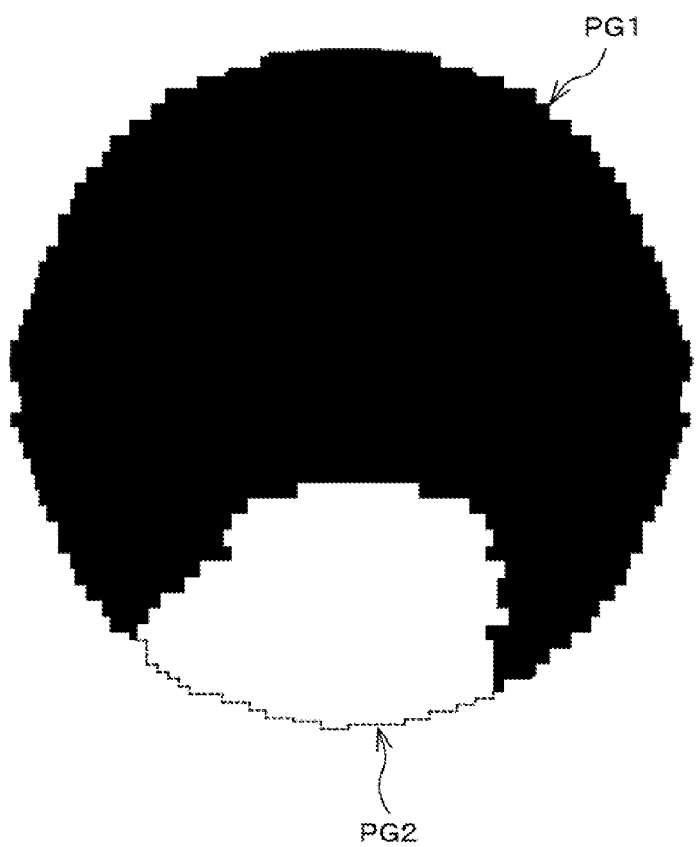
[FIG. 10] An illustration showing a low brightness pixel group and a high brightness pixel group constituting a pupil.

By the way, generally, when an image containing a pupil is captured, some of the pixels constituting the pupil have higher brightness under the influence of reflected light reflected on the surface of the cornea. Consequently, the pixels constituting the pupil appearing in the binary image P2 are divided into two groups: a low brightness pixel group PG1 and a high brightness pixel group PG2. FIG. 10 shows an exemplary low brightness pixel group PG1 and high brightness pixel group PG2 constituting a pupil contained in the binary image P2. As apparent also from FIG. 10, in this embodiment, the high brightness pixel group PG2 is localized in the pixels constituting a pupil image. As the number of pixels constituting the high brightness pixel group PG2 is increased, the reference pixel $PX_0$ may presumably be shifted away from the center of the pupil. Then, the image processing unit 30 detects the pupil center position based on the distribution of the low brightness pixel group PG1 constituting the pupil in the binary image P2 and the position information on the reference pixel $PX_0$.

Figure 11:
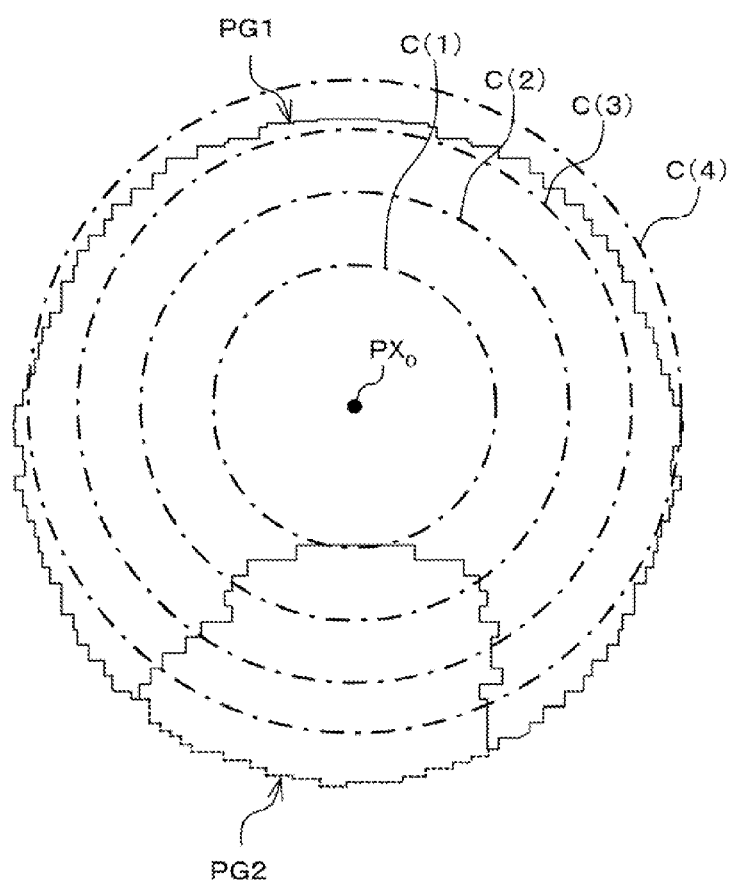
[FIG. 11] An illustration for explaining the operation of the pupil center position identifying part (Part 1)

As shown in FIG. 11, the pupil center position identifying part 34 sets a circle C (1) having the center at the reference pixel $PX_0$. The circle C (1) has a radius r (1) sufficiently smaller than the radius of the pupil. For example, it is desirable to determine the radius r (1) of the circle C (1) in consideration of the distribution of the low brightness pixel group PG1 in the X-axis direction or in the Y-axis direction.

Then, the pupil center position identifying part 34 sets a circle C (2) having the center at the reference pixel $PX_0$ and a radius larger than the radius r (1) of the circle C (1).

Then, the pupil center position identifying part 34 calculates the areas $S_1$ and $S_2$ of the circles C (1) and C (2) and the numbers $N_1$ and $N_2$ of low brightness pixels inside the circles C (1) and C (2), respectively. Then, the pupil center position identifying part 34 calculates the ratio $R_1$ of the number of low brightness pixels inside the respective circles $(N_2-N_1)$ to the difference in area between the circles C (1) and C (2) $(S_2-S_1)$. in other words, $R_1=(N_2-N_1)/(S_2-S_1)$.

Then, the pupil center position identifying part 34 determines whether the calculated ratio $R_1$ is equal to or higher than a given value. If the determination turns out to be affirmative, the pupil center position identifying part 34 sets a circle C (3) having a radius larger than the radius of the circle C (2). Then, the pupil center position identifying part 34 calculates the areas $S_2$ and $S_3$ of the circles C (2) and C (3) and the numbers $N_2$ and $N_3$ of low brightness pixels inside the circles C (2) and C (3), respectively. Then, the pupil center position identifying part 34 calculates the ratio $R_2$ of the number of low brightness pixels inside the respective circles $(N_3-N_2)$ to the difference in area between the circles C (2) and C (3) $(S_3-S_2)$. In other words, $R_2=(N_3-N_2)/(S_3-S_2)$.

The pupil center position identifying part 34 determines whether the calculated ratio $R_2$ is equal to or higher than a given value. Following this, the above process is repeated until a ratio $R_N$ equal to or lower than a given value is obtained. In this repetition, two circles defined on the pupil image in the binary image P2 are gradually enlarged. Here, the ratios $R_1, R_2, \ldots$ are collectively termed $R_N(N=1, 2, \ldots)$.

In the repetition, when a ratio $R_N$ equal to or lower than a given value is obtained, the pupil center position identifying part 34 identifies the pupil center position using the circle C (N) at the time. Here, the case in which the circles C (1), C (2), and C (3) are inside a region defined by the low brightness pixel group PG1 and high brightness pixel group PG2 and the circle C (4) is outside the region (see FIG. 11) will be described.

Since the circles C (1), C (2), and C (3) contains only pixels belonging to either one of the low brightness pixel group PG 1 and high brightness pixel group PG2 constituting the pupil, the calculated ratios $R_1$ and $R_2$ are nearly constant. On the other hand, the circle C (4) contains pixels belonging to neither one of the low brightness pixel group PG1 and high brightness pixel group PG2 constituting the pupil. These pixels are high brightness pixels constituting an iris image. For this reason, the circle C (4) contains a smaller number $N_4$ of low brightness pixels and consequently the calculated ratio $R_3$ $(=(N_4-N_3)/(S_4-S_3))$ is lower than a given value.

Figure 12:
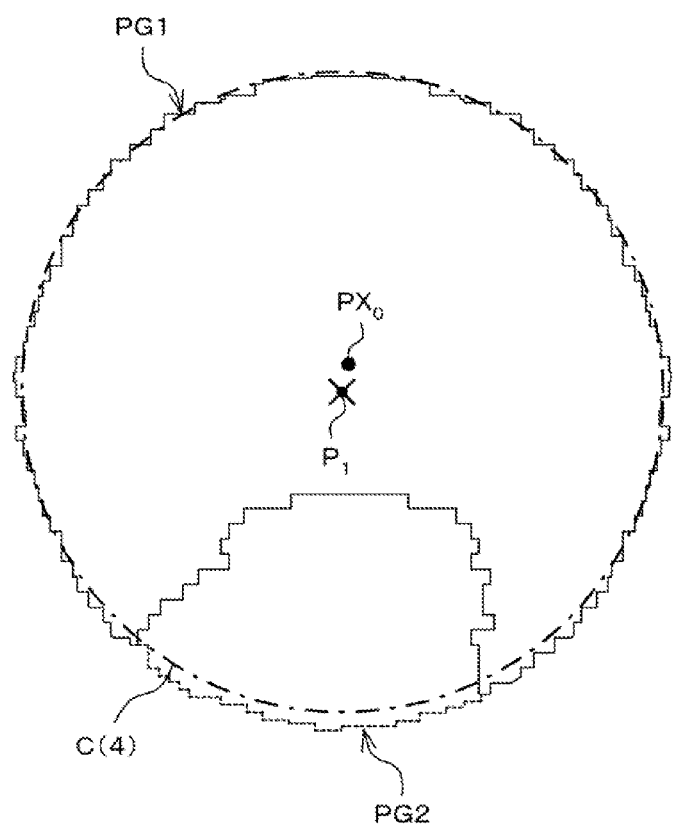
[FIG. 12] An illustration for explaining the operation of the pupil center position identifying part (Part 2)

Then, the pupil center position identifying part 34 moves the circle C (4) with respect to the reference pixel $PX_0$ as the reference position as seen in FIG. 12 and searches for the center position $P_1$ of the circles C (4) where the number of low brightness pixels contained in the circle C (4) is maximized. Then, the pupil center position identifying part 34 identifies the found position $P_1$ as the pupil center position.

Here, it is desirable to give the circles C (1) to C (N) radiuses different, for example, by 1 to several pixels on the basis of pixel size. The accuracy of detection of the pupil center position is improved as the difference in radius between circles C (N-1) and C (N) is smaller.

Figure 13:
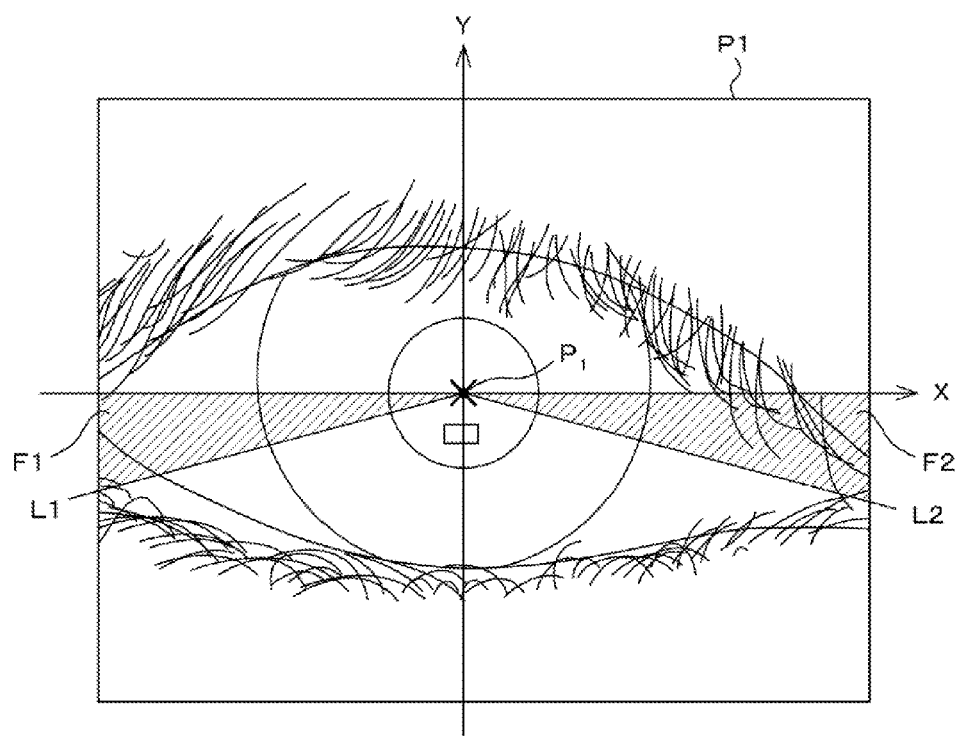
[FIG. 13] An illustration for explaining the operation of the region setting part (Part 1)
Figure 14A:
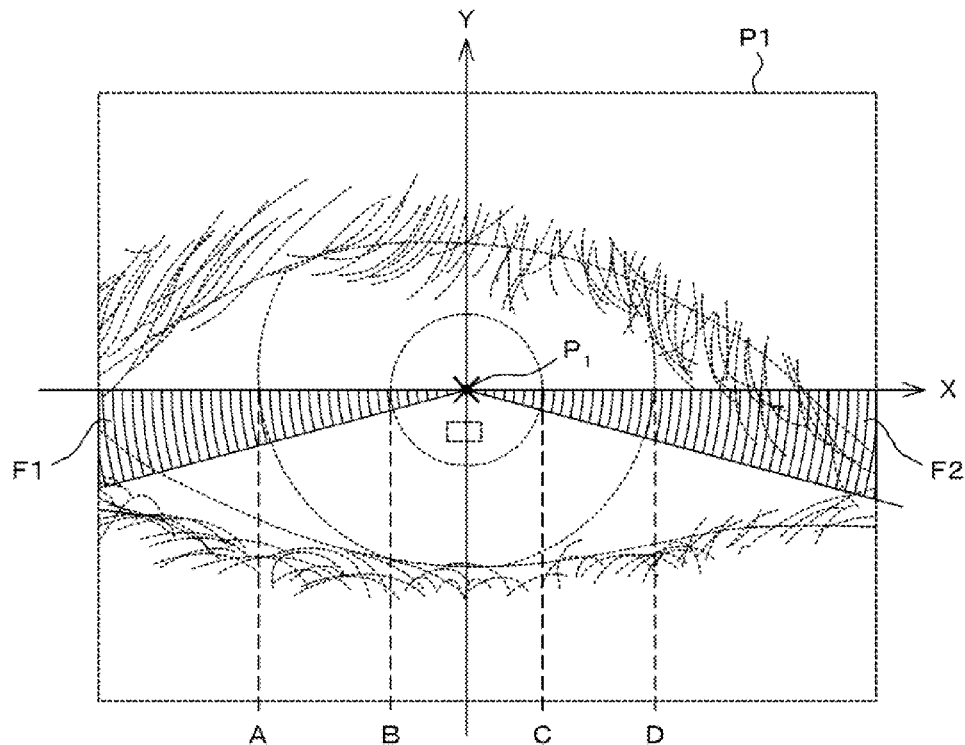
[FIG. 14A] An illustration for explaining the operation of the region setting part (Part 2)

The region setting part 35 defines an XY coordinate system having the point of origin at the position $P_1$ on the image P1 as shown in FIG. 13. On this coordinate system, the X-axis extends in the horizontal direction (in the transversal direction). Then, the region setting part 35 defines triangular regions F1 and F2 defined by lines L1 and L2 each originating from the position $P_1$ and making an angle of 15 degrees with respect to the X-axis on the image P1. Then, as shown in FIG. 14A, the region setting part 35 divides the region F1 by multiple arcs having the center angle defined by the X-axis and line L1 to set up multiple small arc-shaped regions. Furthermore, the region setting part 35 divides the region F2 by multiple arcs having the center angle defined by the X-axis and line L2 to set up multiple small arc-shaped regions.

Figure 14B:
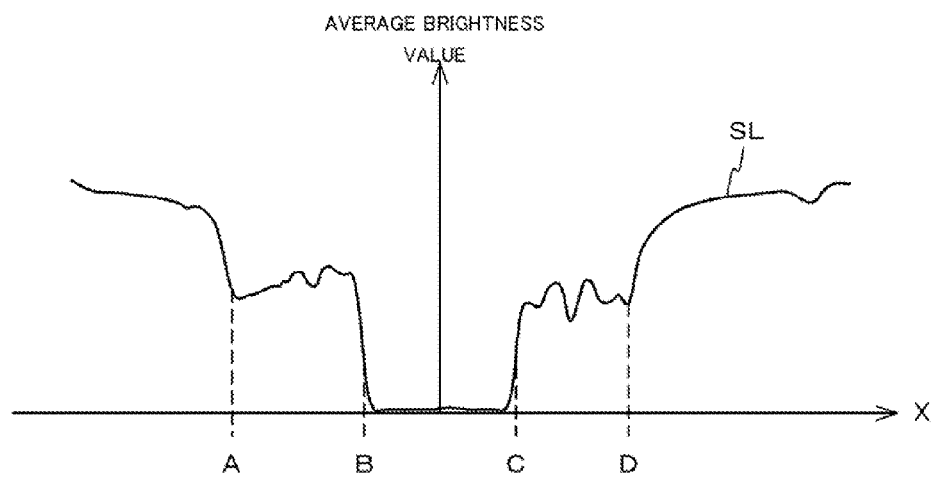
[FIG. 14B] A graphical representation showing a characteristic curve.

FIG. 14B shows a characteristic curve SL presenting the relationship between a position x and the average brightness value of an arc-shaped small region. The iris pattern identifying part 36 calculates the average brightness value of pixels contained in each small region belonging to the region F1 or F2. Then, the iris pattern identifying part 36 calculates a characteristic curve SL presenting the relationship between the position on the X-axis and the corresponding average brightness value of a small region. Then, the iris pattern identifying part 36 obtains the X coordinates A and D of the intersections between the X-axis and the outer rim of the iris based on the degree of change of the characteristic curve SL.

The X coordinates A and D can be identified, for example, by differentiating the characteristic curve SL at a position x on the X-axis to yield a differential value and comparing the differential value with a given threshold. As seen from the characteristic curve SL in FIG. 14B, generally, the degree of change in the average brightness value is continuous on the border between the iris region and the white of the eye. Furthermore, the degree of change in the average brightness value is higher in the transition area from the iris region to the white region than in the other regions. Using such a characteristic, the X-coordinates A and D of the intersections between the X-axis and the outer rim of the iris can be obtained with accuracy based on differential values of the characteristic curve SL. Here, the X coordinates B and C are of the intersections between the X-axis and the outer rim of the pupil.

Figure 15:
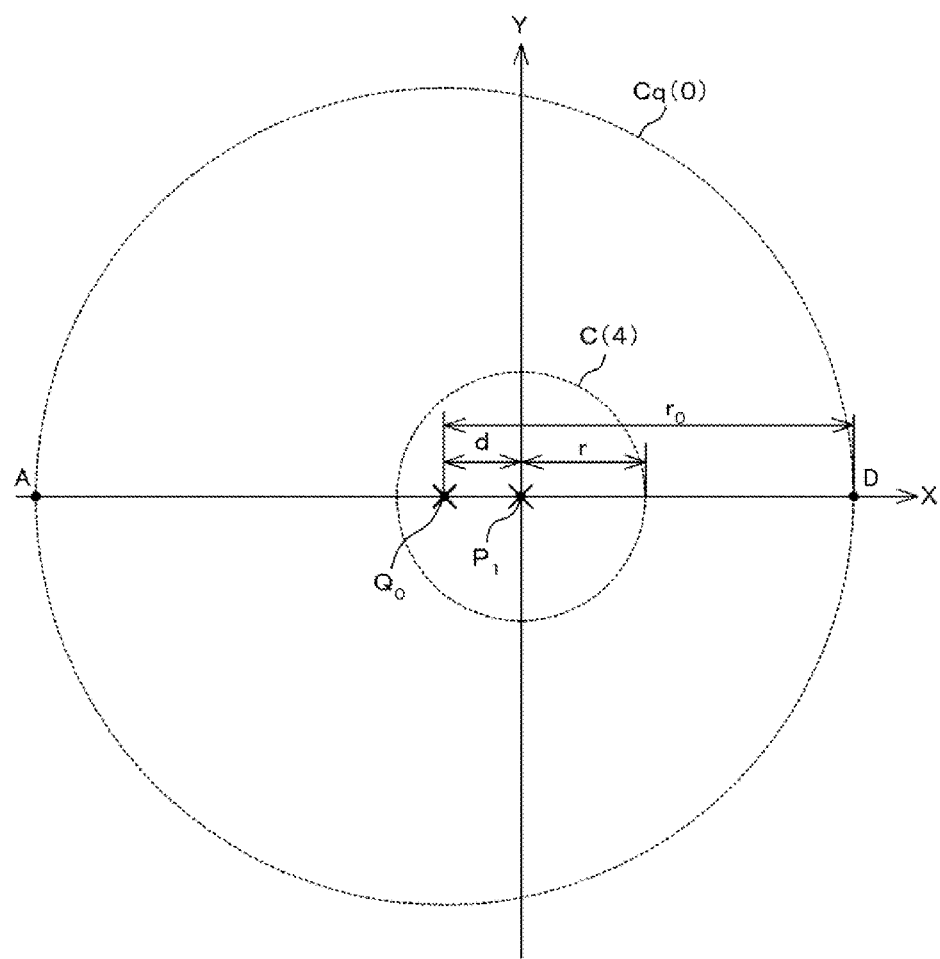
[FIG. 15] An illustration for explaining the operation of the iris pattern identifying part.

As shown in FIG. 15, for example, a circle Cq (0) is so defined as to have the center on the X-axis and pass through the points (A, 0) and (D, 0). The circle Cq (0) is a circle having the center $Q_0$ at a point ((A+D)/2, 0) and a radius of (D–A)/2. The circle Cq (0) nearly matches the outer rim of the iris and the circle C (4) nearly matches the outer rim of the pupil. Then, obtaining the X coordinates A and D, the iris pattern identifying part 36 identifies a region defined by the circles C (4) and Cq (0) having the center at the position $P_1$ on the image P1 as a region where an iris image is present. Then, the iris pattern identifying part 36 outputs the identified result to the noise region identifying part 37.

The noise region identifying part 37 has a calculation part 37a and a position identifying part 37b. The position identifying part 37b identifies the position of a noise region based on calculation results by the calculation part 37a.

Figure 16:
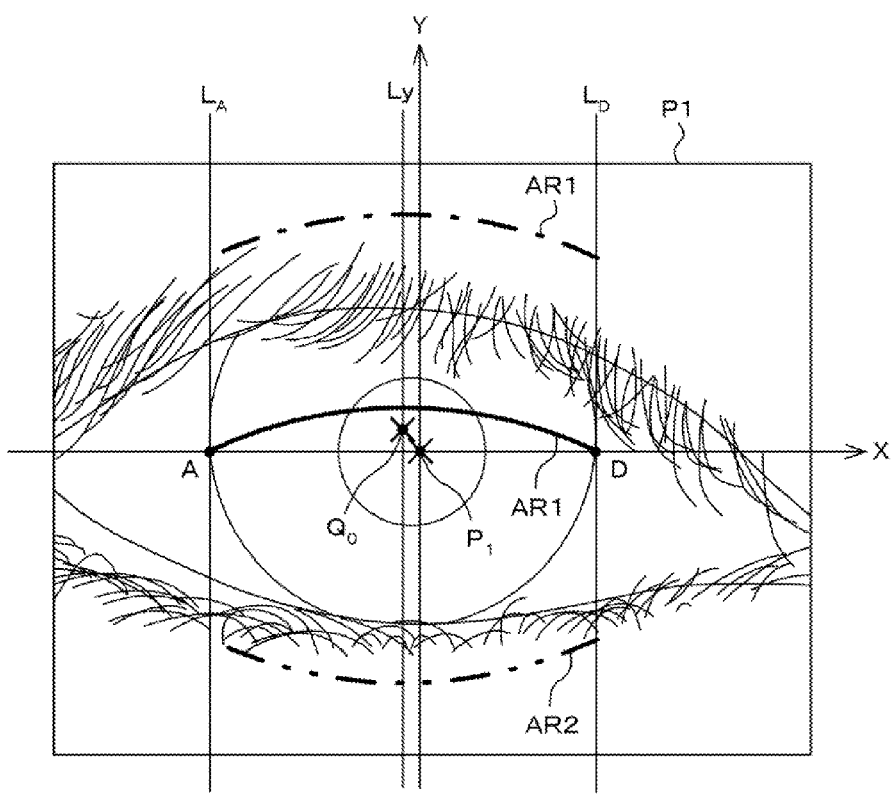
[FIG. 16] An illustration for explaining the operation of the calculation part constituting the noise region identifying part.

As shown in FIG. 16, first, the calculation part 37a defines a line Ly parallel to the Y-axis and passing through the center $Q_0$ of the circle Cq (0) nearly matching the outer rim of the iris and an arc AR1 that is a part of a circle having the center on the line Ly. The arc AR1 is, for example, an upwardly convex arc corresponding to a part of a circle having a radius 2.4 to 3 times larger than the radius of the circle Cq (0) nearly matching the outer rim of the iris and present between a line $L_A$ parallel to the Y-axis and passing through the point A and a line $L_D$ parallel to the Y-axis and passing through the point D. The two ends of the arc AR1 have the same Y coordinate value. In this embodiment, the position of the arc AR1 is defined by the position of its ends. Hereafter, using the Y-axis coordinate y, the position of the arc AR1 is defined as a position y.

Then, the calculation part 37a moves the arc AR1 from the position 0 indicated by the solid line in FIG. 16 in the +Y direction by a distance equal to or larger than the radius of the circle Cq (0). Consequently, the arc AR1 moves from the pupil center position or its vicinity (the position indicated by the solid line on the image P1) to a position on the upper eyelid (the position indicated by the dot-dash line).

During the above movement, the calculation part 37a calculates the average brightness value of pixels constituting the image P1 overlapping with the arc AR1 in sequence as the arc AR1 moves by one pixel on the image P1. Consequently, as shown in FIG. 17A by way of example, a characteristic curve SL1 presenting the position of the arc AR1 and the average brightness value is obtained.

Figure 17A:
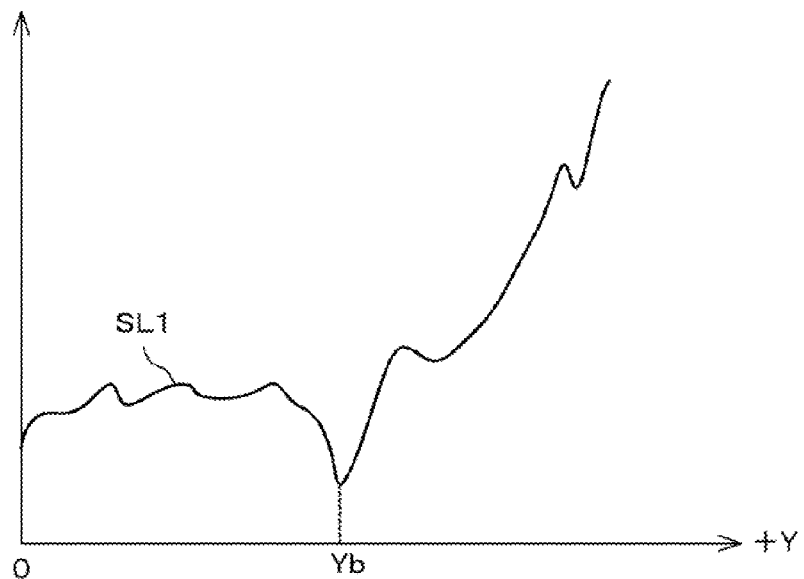
[FIG. 17A] A graphical representation showing a characteristic curve SL1.

As seen from the characteristic curve SL1 shown in FIG. 17A, the characteristic curve SL1 has an abrupt drop in the average brightness value at a point Yb. This is because the arc AR1 overlaps with the eyelash part presented by low brightness pixels on the image P1 at the point Yb on the Y-axis. Therefore, once a characteristic curve SL1 is obtained, the boundary region where the eyelash part image mixed in the iris image becomes dominant can be detected by finding a point where the characteristic curve SL1 has an abrupt change (simply "the change point" hereafter).

Then, the position identifying part 37b applies calculation using a filter given by the equation (1) below to the characteristic curve SL1 obtained as described above so as to obtain a function F (y) and detects the change point of the characteristic curve SL1 based on the function F (y). As apparent from the equation (1), the filter suggests obtaining the difference (P (y)–P (y+k)) between the average brightness value P (y) at a position y and the brightness P (y+k) at a position y+k shifted from the position y by k pixels in the +Y direction for k=1 to n. The filter further suggests obtaining the difference (P (y)–P(y–k)) between the average brightness value P (y) at a position y and the brightness P (y–k) at a position y–k shifted from the position y by k pixels in the –Y direction for k=1 to n. Then, the filter suggests integrating the obtained differences (P (y)–P (y+k)) and (P (y)–P (y–k)) to yield an integrated value F (y). According to this filter, F (y) at a position y has a value 0 when there is no change in the gradient of the characteristic curve before and after the position y. On the other hand, when the sign of the gradient is altered, F (y) at a position y increases in absolute value based on the degree of change.

[Math 1]

$$F(y)=2n \cdot P(y)-\Sigma(P(y-n)+ \ldots +P(y-1))-\Sigma(P(y+1)+ \ldots +P(y+n)) \quad (1)$$

Figure 17B:
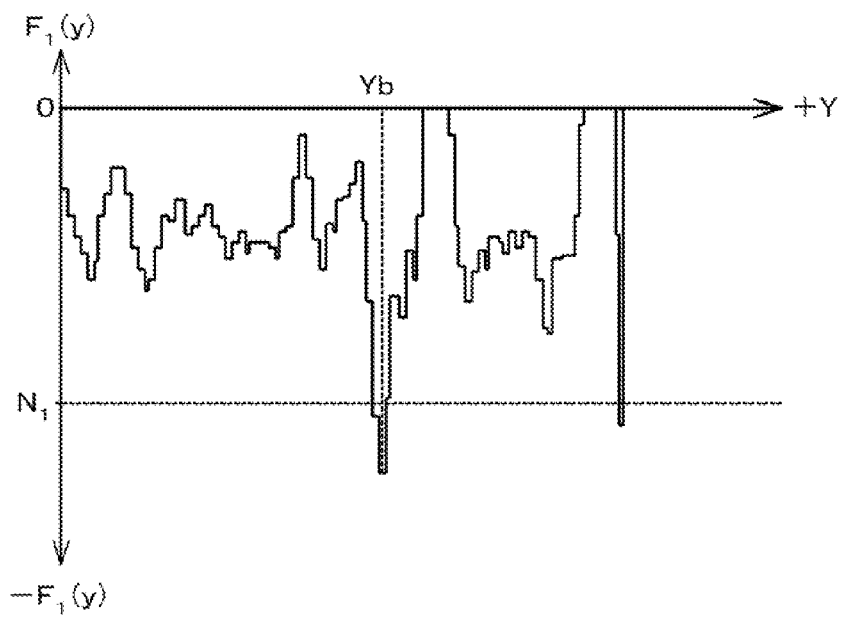
[FIG. 17B] A graphical representation showing a function $F_1(y)$.
Figure 18A:
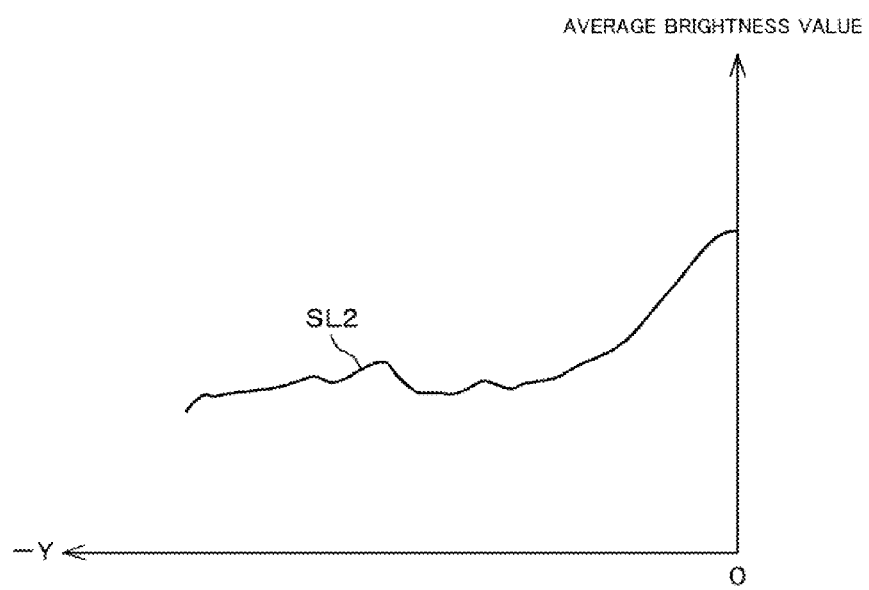
[FIG. 18A] A graphical representation showing a characteristic curve SL2.
Figure 18B:
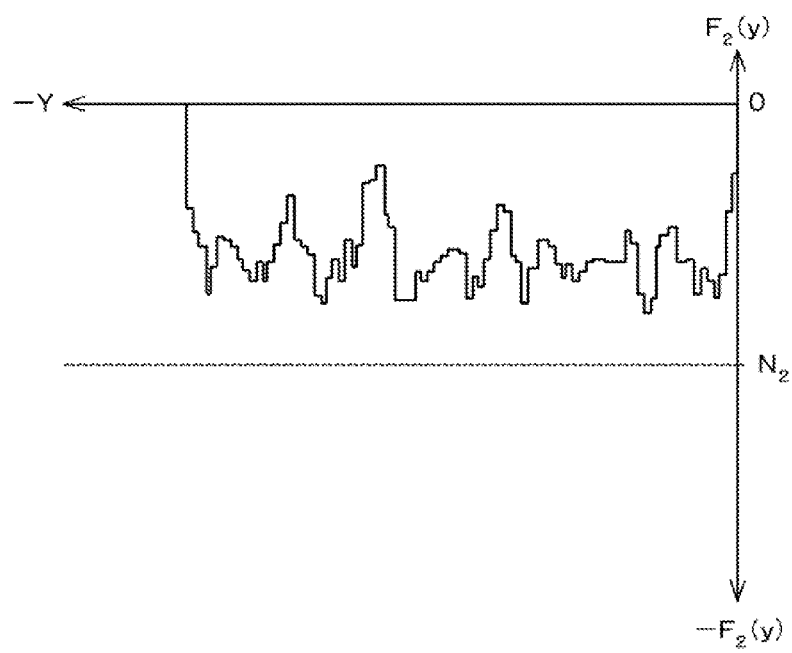
[FIG. 18B] A graphical representation showing a function $F_2(y)$.

For example, when n is 4, the position identifying part 37b performs the filter calculation in regard of a position y and eight positions shifted forward and backward from the position y at one pixel intervals to obtain a function F (y) shown in FIG. 17B (here, $F_1$ (y)). This function $F_1$ (y) is used to detect the change point of the characteristic curve SL1 where the value abruptly drops. Therefore, FIG. 17B shows only the parts yielding negative values.

The position identifying part 37b detects the change point of the characteristic curve SL1 based on the function $F_1$ (y). More specifically, it detects a point Yb on the Y-axis where the value of the function $F_1$ (y) is minimized and equal to or lower than a given threshold $N_1$.

Then, the position identifying part 37b defines a downwardly convex arc AR2 as shown by the dot-dot-dash line in FIG. 16 in the same manner as for the arc AR1. Then, the position identifying part 37b moves the arc AR2 in the −Y direction, calculates the average brightness value of pixels constituting the image P1 overlapping with the arc AR2 in sequence, and obtains a characteristic curve SL2 shown in FIG. 18A. Then, the position identifying part 37b applies calculation using the filter presented by the above equation (1) to the characteristic curve to obtain a function F (y) shown in FIG. 18B (here $F_2$ (y)). Then, the position identifying part 37b detects a point on the Y-axis where the value of the function $F_2$ (y) is minimized and equal to or lower than a given threshold $N_2$. In this embodiment, for example as seen from FIG. 16, the lower half of the iris image is nearly completely exposed and is not mixed with the eyelash part image. In such a case, the characteristic curve SL2 has no change point; therefore, a Y-coordinate where the value of the function $F_2$ (y) is minimized and equal to or lower than a given threshold $N_2$ is not detected.

Here, the thresholds $N_1$ and $N_2$ for detecting the change points of the characteristic curves SL1 and SL2 can be determined independently in consideration of statistical results and the installation position of the imaging unit 10. For example, generally, the iris image is mixed with eyelash image components in the upper part. On the other hand, the iris image is rarely mixed with eyelash image components in the lower part; however, the eye bags (wrinkles below the eye) sometimes protrude over the iris image. In consideration of such a fact, it is possible to obtain samples of the characteristic curves SL1 and SL2 from multiple eye images and determine the thresholds $N_1$ and $N_2$ independently based on the sample results. In this way, a region where noise components are mixed can be identified in the entire iris image with accuracy.

Figure 19:
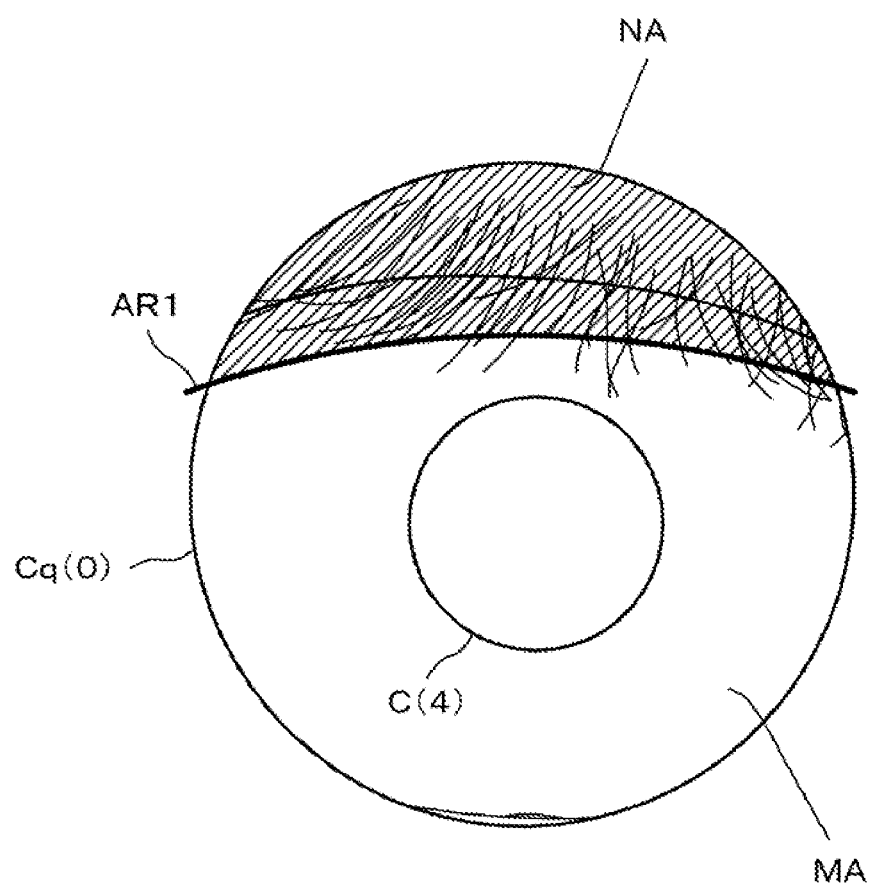
[FIG. 19] An illustration for explaining the operation of the position identifying part.

Detecting the coordinate of the change point as described above, the position identifying part 37b identifies a region where noise is mixed ("the noise region" hereafter) in the iris image based on the detection results and outputs to the matching unit 50 information regarding the region of the iris image excluding the noise region ("the matching region" hereafter). More specifically, as shown in FIG. 19, a noise region NA defined by the arc AR1 at the position corresponding to the change point of the characteristic curve SL1 and the circle Cq (0) is excluded from the region defined by the circles C (4) and Cq (0) contained in the image P1. Then, information regarding the remaining matching region MA is output to the matching unit 50.

First, the matching unit 50 creates a code for the subject to compare based on the iris image identified by the iris pattern identifying part 36.

As shown in FIG. 15, the center $P_1$ of the circle C (4) nearly matching the outer rim of the pupil generally does not coincide with the center $Q_0$ of the circle Cq (0) nearly matching the outer rim of the iris. This is because the right and left lines of sight of a person are generally not parallel due to parallax and the lines of sight and the optical axis of the lens (not shown) of the imaging unit 10 are not parallel even in capturing a frontal eye image of the subject. The iris is spherical and therefore the center of the iris and the center of the pupil do not align in a digital image P captured by the imaging unit 10 having the lens optical axis tilted with respect to the line of sight.

Figure 20:
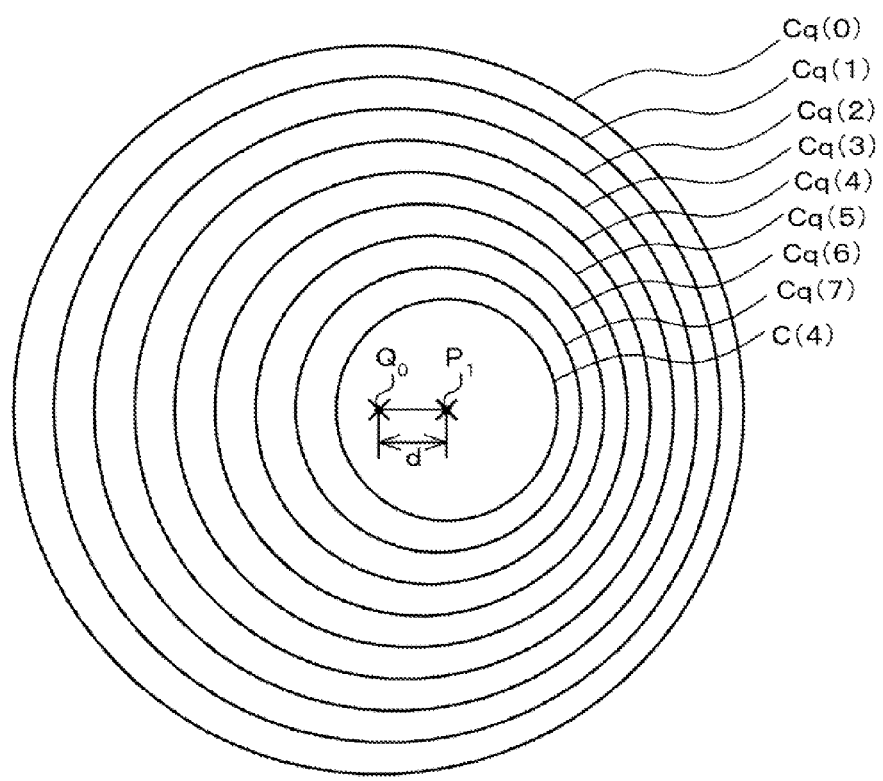
[FIG. 20] An illustration for explaining the operation of the matching unit (Part 1)
Figure 21:
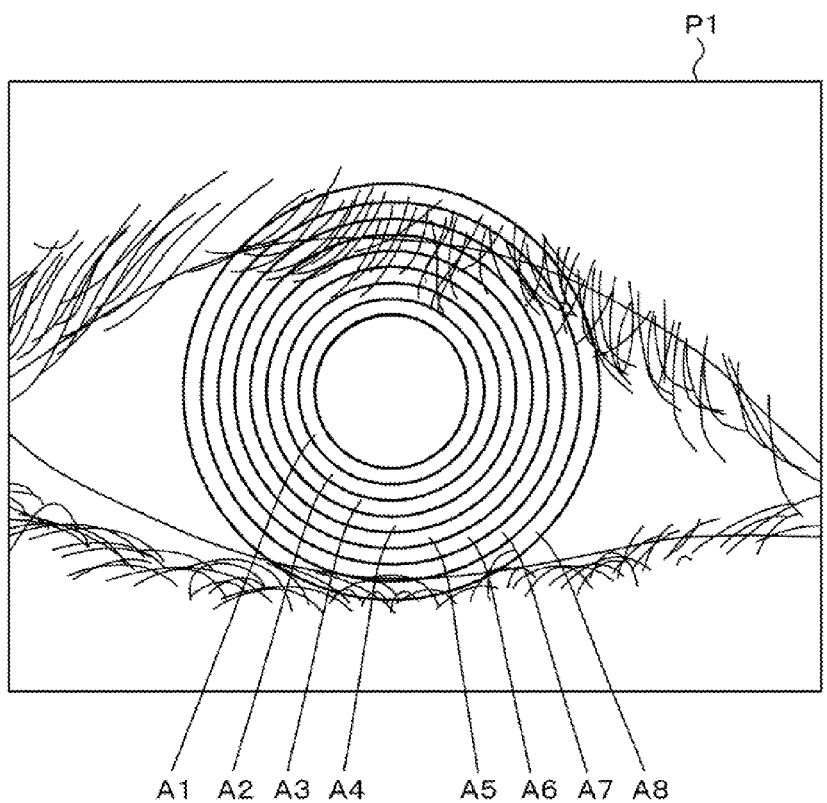
[FIG. 21] An illustration for explaining the operation of the matching unit (Part 2)

In consideration of the above matter, the matching unit 50 divides the region defined by the circle C (4) nearly matching the outer rim of the pupil and the circle Cq (0) nearly matching the outer rim of the iris into eight annular regions by seven circles Cq (1) to Cq (7) as shown in FIG. 20. This operation will be described more specifically hereafter.

First, the matching unit 50 measures the distance d between the center $P_1$ of the circle C (4) and the center $Q_0$ of the circle Cq (0). Then, the matching unit 50 calculates the centers $Q_1$ to $Q_7$ of the circles Cq (1) to Cq (7) by adding one eighth of the distance d to the X-axis coordinate of the center $Q_0$. Here, the calculated coordinates of the centers $Q_1$ to $Q_7$ are $Q_1((A+D)/2+d/8, 0)$, $Q_2((A+D)/2+d/4, 0)$, $Q_3((A+D)/2+3d/8, 0)$, $Q_4((A+D)/2+d/2, 0)$, $Q_5((A+D)/2+5d/8, 0)$, $Q_6((A+D)/2+3d/4, 0)$, and $Q_7((A+D)/2+7d/8, 0)$.

Then, the matching unit 50 calculates the radiuses $r_1$ to $r_7$ of the circles Cq (1) to Cq (7) by subtracting one eighth of the difference between the radius (r) of the circle C (4) and the radius $r_0$ of the circle Cq (0) from the radius $r_0$ of the circle Cq (0). Here, the calculated radiuses $r_1$ to $r_7$ are $r_1: (r_0-(r_0-r)/8)$, $r_2: (r_0-2\cdot(r_0-r)/8)$, $r_3: (r_0-3\cdot(r_0-r)/8)$, $r_4: (r_0-4\cdot(r_0-r)/8)$, $r_5: (r_0-5\cdot(r_0-r)/8)$, $r_6: (r_0-6\cdot(r_0-r)/8)$, and $r_7: (r_0-7\cdot(r_0-r)/8)$.

Then, the matching unit 50 defines seven circles Cq (1) to Cq (7) in the region defined by the circles Cq (0) and C (4) as shown in FIG. 20 based on the calculation results regarding the centers $Q_1$ to $Q_7$ and radiuses $r_1$ to $r_7$ as calculated above. Consequently, as seen from the FIG. 21, the iris image contained in the image P1 is divided into eight annular regions A1 to A8 by the seven circles Cq (1) to Cq (7).

Then, the matching unit 50 divides each of the eight annular regions A1 to A8 into, for example, 256 small regions. More specifically, the circumferences of the circles C (4) and Cq (1) to Cq (7) are divided into 256 arcs having the equal center angles. Then, a small region is created by defining a pair of arcs consisting of an arc of a circle (for example, the circle C (4)) and the corresponding arc of the adjacent circle (for example, the circle Cq (7)) and the lines connecting the ends of the arcs. The method of creating the small regions will be described more specifically hereafter with reference to FIG. 22.

Figure 22:
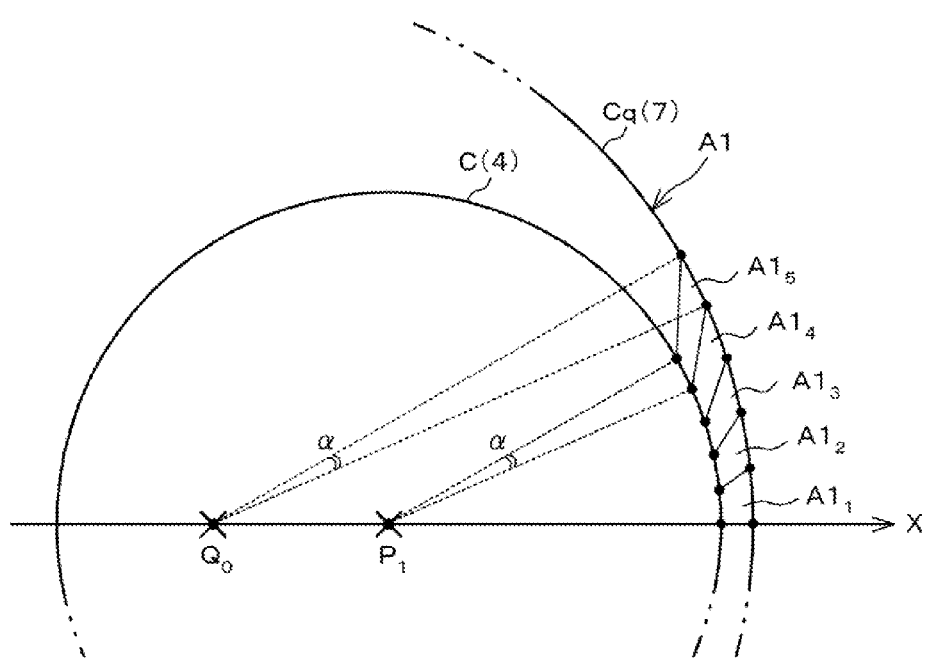
[FIG. 22] An illustration for explaining the operation of the matching unit (Part 3)

FIG. 22 shows how the annular region A1 defined by the circles C (4) and Cq (7) is divided into 256 small regions. As shown in FIG. 22, the matching unit 50 divides the circles C (4) and Cq (7) into arcs having a center angle α (360/256) using the intersection between each circle and the X-axis as the base point and defines the lines connecting the ends of corresponding arcs, whereby the annular region A1 is divided into small regions $A1_1$ to $A1_{256}$. Similarly, the matching unit 50 divides the annular regions A2 to A8 into small regions $A2_1$ to $A2_{256}$, small regions $A3_1$ to $A3_{256}$, small regions $A4_1$ to $A4_{256}$, small regions $A5_1$ to $A5_{256}$, small regions $A6_1$ to $A6_{256}$, small regions $A7_1$ to $A7_{256}$, and small regions $A8_1$ to $A8_{256}$, respectively.

Then, the matching unit 50 divides the small regions $A1_1$ to $A1_{256}$ belonging to the annular region A1 into small regions belonging to the noise region NA identified by the noise region identifying part 37 and small regions belonging to the matching region MA. Then, the matching unit 50 grants, for example, "0" to each of the small regions belonging to the noise region NA and to each of the small regions belonging to the matching regions MA the average brightness value of the pixels contained in the small region. Then, the matching unit 50 arranges the values VAL granted to the small regions in the positional order of the small regions to create a code 1 $[VAL1_1, VAL1_2, \ldots VAL1_{256}]$.

Similarly, the matching unit 50 executes the same process as described above for the annular region A1 on the annular regions A2 to A8 to create a code 2 $[VAL2_1, VAL2_2, \ldots, VAL2_{256}]$, a code 3 $[VAL3_1, VAL3_2, \ldots, VAL3_{256}]$, a code 4 $[VAL4_1, VAL4_2, \ldots, VAL4_{256}]$, a code 5 $[VAL5_1, VAL5_2, \ldots, VAL5_{256}]$, a code 6 $[VAL6_1, VAL6_2, \ldots, VAL6_{256}]$, a code 7 $[VAL7_1, VAL7_2, \ldots, VAL7_{256}]$, and a code 8 [$VAL8_1$, $VAL8_2$, ..., $VAL8_{256}$]. Subsequently, the matching unit 50 manages the above eight codes 1 to 8 as a set of matching subject codes.

In the matching unit 50, data created based on iris images identified in advance through the same process as in the image processing unit 30 and regarding multiple sets of eight codes associated with particular personal information are accumulated. The matching unit 50 performs matching between the above set of matching subject codes and the sets of codes accumulated in advance ("sets of matching codes" hereafter). If a set of matching codes of which the degree of similarity to the set of matching subject codes is equal to or higher than a given value is identified, the matching unit 50 outputs the result and the personal information associated with that set of matching codes to an external device. On the other hand, if no set of matching codes of which the degree of similarity to the set of matching subject codes is equal to or higher than a given value is identified, the matching unit 50 outputs the result to an external device.

As described above, in Embodiment 1, the arcs AR1 and AR2 are used to identify with accuracy a noise region NA where eyelash and eyelid parts are mixed in the iris image contained in a digital eye image P based on the characteristic curves SL1 and SL2 obtained by scanning the iris image. Then, data created based on the iris image from which the noise region NA is excluded are used for authentication. Therefore, the subject can be authenticated with accuracy without being affected by noise.

Furthermore, in Embodiment 1, a digital iris image P is scanned using given arcs AR1 and AR2 to identify a noise region NA. In this way, the noise region NA can quickly be identified compared with when eyelash-related parts are extracted from an iris image as they are. Consequently, the accuracy of authentication will be improved and the process can be expedited.

For example, in the above embodiments, a noise region where eyelash and upper eyelid parts are mixed is identified and a noise region where eyelash and lower eyelid parts are mixed is not identified. Needless to say, it is possible to identify a region where eyelash and lower eyelid parts are mixed if any. In other words, the eyelid includes both the upper eyelid and the lower eyelid in the present invention. However, needless to say, the accuracy of authentication can be improved by identifying a noise region in regard to either one of the upper and lower eyelids and excluding the noise region.

(Embodiment 2)

Embodiment 2 of the present invention will be described hereafter with reference to FIGS. 23 and 24. The same or equivalent components as or to those in Embodiment 1 are referred to by the same reference numbers and their explanation will be omitted or simplified.

A biometric authentication apparatus 2 according to this embodiment is different from the biometric authentication apparatus 1 in the above Embodiment 1 in that the image processing unit 30 is realized by a general computer or a configuration similar to an apparatus such as a work station.

Figure 23:
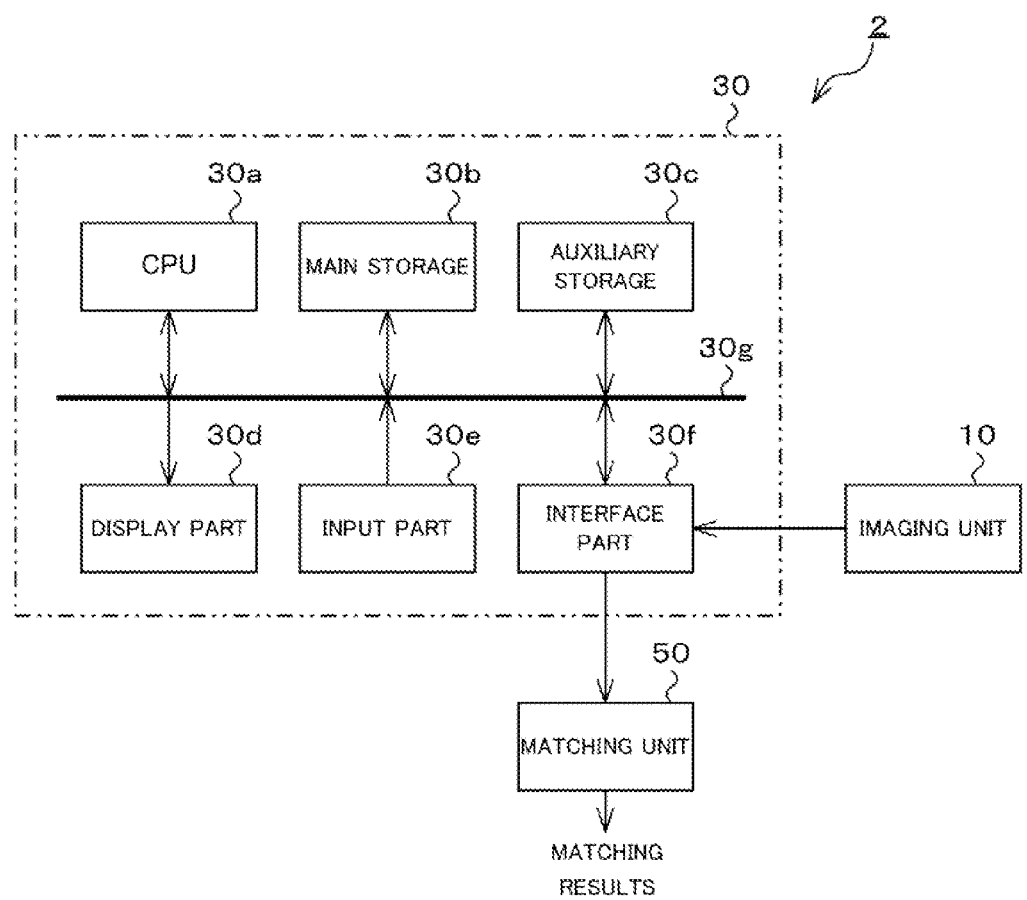
[FIG. 23] A block diagram of a biometric authentication apparatus according to Embodiment 2 of the present invention.

FIG. 23 is a block diagram showing the physical configuration of the biometric authentication apparatus 2. As shown in FIG. 23, the biometric authentication apparatus 2 comprises an imaging unit 10, an image processing unit 30 consisting of a computer, and a matching unit 50.

The image processing unit 30 comprises a CPU (central processing unit) 30a, a main storage 30b, an auxiliary storage 30b, a display part 30d, an input part 30e, an interface part 30f, and a system bus 30g connecting them to each other.

The CPU 30a executes image processing described later on an image P captured by the imaging unit 10 according programs stored in the auxiliary storage 30c.

The main storage 30b has a RAM (random access memory) or the like. The main storage 30b is used as the working area of the CPU 30a.

The auxiliary storage 30c comprises a nonvolatile memory such as a ROM (read only memory), magnetic disc, and semiconductor memory. The auxiliary storage 30c stores programs executed by the CPU 30a and various parameters. Furthermore, the auxiliary storage 30c stores information including processing results of the CPU 30a.

The display part 30d comprises a CRT (cathode ray tube) or LCD (liquid crystal display). The display part 30d displays processing results of the CPU 30a. In this embodiment, each time a digital image P is processed, a binary image P2 and an image P3 are displayed on the display part 30d as processing results.

The input part 30e comprises a keyboard and a pointing device such as a mouse. Instructions from the operator are entered via the input part 30e and given to the CPU 30a via the system bus 30g.

The interface part 30f comprises a serial interface or LAN (local area network) interface. The imaging unit 10 and matching unit 50 are connected to the system bus 30g via the interface part 30f.

Figure 24:
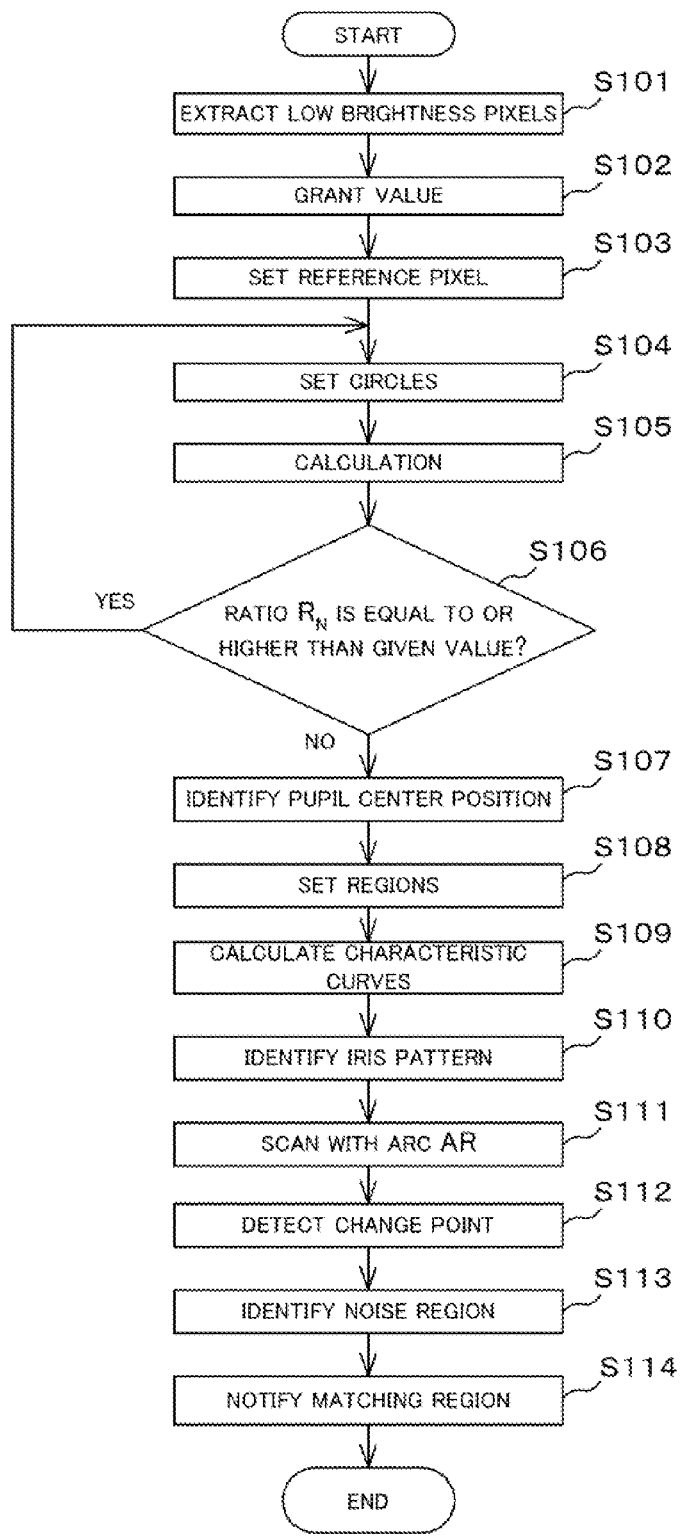
[FIG. 24] A flowchart showing the operation of the image processing apparatus.

The flowchart in FIG. 24 corresponds to a series of processing algorithms of programs executed by the CPU 30a of the image processing unit 30. The image processing of the image processing unit 30 will be described hereafter with reference to FIG. 24. Here, the image processing is realized by the CPU 30a controlling the main storage 30b, auxiliary storage 30c, display part 30d, and interface part 30f in an integral manner according to programs read from the auxiliary storage 30c.

First, the CPU 30a extracts low brightness pixels having brightness equal to or lower than a given threshold among multiple pixels constituting a digital image P captured by the imaging unit 10 (Step S101). More specifically, the CPU 30a extracts low brightness pixels in a binary image P2 obtained by image conversion of the digital image P using a given threshold.

Subsequently, the CPU 30a selects the extracted low brightness pixels in sequence and grants, for example, a value "1" to multiple pixels within a given distance from the selected low brightness pixel (Step S102).

Subsequently, the CPU 30a sets the pixel having the highest accumulated granted value as a reference pixel $PX_0$ (Step S103). The reference pixel $PX_0$ is located nearly at the center of the pupil appearing in the image P1 (see FIG. 9).

Subsequently, the CPU 30a sets a circle C (1) having the center at the reference pixel $PX_0$ and a circle C (2) having a radius larger than the radius of the circle C (1) (Step S104).

Subsequently, the CPU 30a performs calculations (Step S105). Here, the CPU 30a first calculates the areas $S_1$ and $S_2$ of the circles C (1) and C (2) and the numbers $N_1$ and $N_2$ of low brightness pixels inside the circles C (1) and C (2), respectively. Subsequently, the CPU 30a calculates the ratio $R_N$ of the number of low brightness pixels inside the respective circles ($N_2-N_1$) to the difference in area between the circles C (1) and C (2) ($S_2-S_1$) (here, $R_1=(N_2-N_1)/(S_2-S_1)$).

Subsequently, the CPU 30a determines whether the ratio $R_N$ is equal to or higher than a given value (Step S106). If the ratio R is equal to or higher than a given value (Step S106; Yes), the CPU 30a returns to Step S104.

In such a case, the CPU 30a sets a new circle C (3) having a radius larger than the radius of the circle C (2) (Step S104).

Then, the CPU 30a calculates the areas $S_2$ and $S_3$ of the circles C (2) and C (3) and the numbers $N_2$ and $N_3$ of low brightness pixels inside the circles C (2) and C (3), respectively. Then, the CPU 30a calculates the ratio $R_2(=(N_3-N_2)/(S_3-S_2))$ of the number of low brightness pixels inside the respective circles $(N_3-N_2)$ to the difference in area between the circles C (2) and C (3) $(S_3-S_2)$ (Step S105). Following this, the procedures of Steps S104 to S106 are repeated until the ratio $R_N$ becomes lower than the given threshold (Step S106; No).

If the ratio $R_N$ is lower than the given value (Step S106; No), the CPU 30a goes to Step S107. For example, as shown in FIG. 11, if the circle C (4) is partly outside the region defined by the pixel groups PG1 and PG2, the determination in Step S106 turns out to be negative.

Subsequently, the CPU 30a moves the circle C (4) with respect to the reference pixel $PX_0$ as the reference position and searches for the center position $P_1$ of the circles C (4) where the number of low brightness pixels contained in the circle C (4) is maximized. Then, the CPU 30a identifies the found position $P_1$ as the pupil center position (Step S107).

Subsequently, the CPU 30a sets up multiple small arc-shaped regions (Step S108). Here, first, the CPU 30a defines an XY coordinate system having the point of origin at the position $P_1$ on the image P1. Then, the CPU 30a defines triangular regions F1 and F2 defined by lines L1 and L2 each originating from the position $P_1$ and making an angle of 15 degrees with respect to the X-axis on the image P1. Subsequently, the CPU 30a divides the region F1 by multiple arcs having the center angle defined by the X-axis and line L1 to set up multiple small arc-shaped regions (see FIG. 14A). Furthermore, the CPU 30a divides the region F2 by multiple arcs having the center angle defined by the X-axis and line L2 to set up multiple small arc-shaped regions.

Subsequently, the CPU 30a calculates the average brightness value of pixels contained in each small region belonging to the region F1 or F2 and calculates a characteristic curve SL presenting the relationship between the position of a small region on the X-axis and the corresponding average brightness (Step S109).

Subsequently, the CPU 30a identifies the iris pattern (Step S110). More specifically, the CPU 30a obtains the X coordinates A and D of the intersections between the X-axis and the outer rim of the iris based on the degree of change in the characteristic curve SL to identify the position of the iris image in the region defined by the circles C (4) and Cq (0) on the image P1 (see FIG. 15).

Subsequently, the CPU 30a performs scanning with the arc AR1 (Step S111). More specifically, first, as shown in FIG. 16, the CPU 30a defines a line Ly parallel to the Y-axis and passing through the center $Q_0$ of the circle Cq (0) nearly matching the outer rim of the iris and an arc AR1 that is a part of a circle having the center on the line Ly. Then, the CPU 30a moves the arc AR1 from the position 0 shown by the solid line in FIG. 16 by a distance larger than the radius of the circle Cq (0).

Meanwhile, the CPU 30a calculates the average brightness value of pixels constituting the image P1 overlapping with the arc AR1 in sequence as the arc AR1 moves by one pixel on the image P1. Consequently, the CPU 30a obtains a characteristic curve SL1 presenting the position of the arc AR1 and the average brightness value as shown in FIG. 17A by way of example.

Then, the CPU 30a defines a downwardly convex arc AR2 as shown by the dot-dot-dash line in FIG. 16. Then, the CPU 30a moves the arc AR2 in the −Y direction, calculates the average brightness value of pixels constituting the image P1 overlapping with the arc AR2 in sequence, and obtains a characteristic curve SL2 shown in FIG. 18A.

Subsequently, the CPU 30a applies a filter calculation presented by the above equation (1) to the characteristic curves SL1 and SL2 to obtain functions $F_1$ (y) and $F_2$ (y). Then, the CPU 30a detects the change points of the characteristic curves SL1 and SL2 based on the functions $F_1$ (y) and $F_2$ (y) (Step S112). More specifically, the CPU 30a detects the change points where the values of the functions $F_1$ (y) and $F_2$ (y) are minimized and equal to or lower than a given threshold $N_1$ or $N_2$.

Detecting the coordinate of the change points as described above, the CPU 30a identifies a noise region NA of the iris image where noise is mixed based on the detection results (Step S113). More specifically, the CPU 30a identifies a matching region MA obtained by excluding the noise region NA from a region defined by the circles C (4) and Cq (0) contained in the image P1 as shown in FIG. 19.

Subsequently, the CPU 30a outputs to the matching unit 50 information containing the processing results in Step S113 (Step S114) and ends a series of processing.

On the other hand, the matching unit 50 divides the iris image identified by the image processing unit 30 into eight annular regions A1 to A8. Then, the matching unit 50 further divides each of the annular regions A1 to A8 into 256 small regions.

Then, the matching unit 50 divides the small regions $An_1$ to $An_{256}$ belonging to the annular regions A1 to A8 (namely An (n=1 to 8)) into small regions belonging to the noise region NA and small regions belonging to the matching region MA. Then, the matching unit 50 grants, for example, "0" to each of the small regions belonging to the noise region NA and to each of the small regions belonging to the matching regions MA the average brightness value of the pixels contained in the small region. Then, the matching unit 50 arranges the values granted to the small regions in the positional order of the small regions to create codes 1 to 8.

Then, the matching unit 50 performs matching between multiple sets of eight codes associated with particular personal information acquired in advance and the set of matching subject codes. If a set of matching codes of which the degree of similarity to the set of matching subject codes is equal to or higher than a given value is identified, the matching unit 50 outputs the result and the personal information associated with that set of matching codes to an external device. On the other hand, if no set of matching codes of which the degree of similarity to the set of matching subject codes is equal to or higher than a given value is identified, the matching unit 50 output the result to an external device.

As described above, in Embodiment 2, the arcs AR1 and AR2 are used to identify with accuracy a noise region NA where eyelash and eyelid parts are mixed in the iris image contained in a digital eye image P based on the characteristic curves SL1 and SL2 obtained by scanning the iris image. Then, data created based on the iris image from which the noise region NA is excluded are used for authentication. Therefore, the subject can be authenticated with accuracy without being affected by noise.

Furthermore, in Embodiment 2, a digital iris image P is scanned using given arcs AR1 and AR2 to identify a noise region NA. In this way, the noise region NA can quickly be identified compared with when eyelash-related parts are extracted from an iris image as they are. Consequently, the accuracy of authentication will be improved and the process can be expedited.

Embodiments of the present invention are described above and the present invention is not confined to the above embodiments.

For example, in the above embodiments, the arcs AR1 and AR2 are used to obtain characteristic curves. A curve approximating the outer rim of the upper eyelid or a curve approximating the outer rim of the lower eyelid can be used in place of the arcs AR1 and AR2.

Furthermore, in the above embodiments, the arcs AR1 and AR2 of a circle having the center on a line Ly parallel to the Y-axis and passing through the center $Q_0$ of a circle Cq (0) that nearly coincides with the center of the iris are used. This is not restrictive and, for example, arcs of a circle having the center on a line parallel to the Y-axis and passing through a reference pixel $PX_0$ or a point $P_1$ found using the circle C (4) can be used.

Furthermore, in the above embodiments, the arcs AR1 and AR2 are used to identify a noise region NA. This is not restrictive and a noise region NA can be identified by sampling data regarding the outer rim of an eyelid of multiple people, determining an optimum curve conforming to the eyelid from the data, and scanning an iris image using the curve.

Furthermore, alternatively, for example, a part of an oval or polygon or a line consisting of a combination of lines and arcs can be used in place of the arcs AR1 and AR2.

Furthermore, in the above embodiments, the arcs AR1 and AR2 are moved from the center of the pupil or its vicinity to above the upper eyelid. This is not restrictive and the arcs AR1 and AR2 can be moved toward the center of the pupil to scan an iris image.

Furthermore, in the above embodiments, the change points of the characteristic curves SL1 and SL2 are detected based on the functions $F_1$ (y) and F2 (y) obtained by applying the above described filter calculation to the calculated characteristics curves SL1 and SL2. The present invention is restricted thereto and, for example, the change points of the characteristic curves SL1 and SL2 are detected based on functions $F'_1$ (y) and $F'_2$ (y) obtained by differentiating the characteristic curves SL1 and SL2.

Furthermore, in the above embodiments, the value of n in the function F (y) presenting a filter is 4. The value of n is not restricted to 4. For example, the value of n can be a proper value in consideration of the resolution of the imaging unit 10 and the distance to the object (subject).

Furthermore, in the above embodiments, the annular regions A1 to A8 are divided into 256 small regions. This is not restrictive and quadrangles can be formed along each of the annular regions A1 to A8 by connecting the ends of a pair of corresponding arcs of adjacent circles.

Furthermore, in the above embodiments, the image processing unit 30 converts a digital image P to a binary image P2 to extract low brightness pixels. This is not restrictive and low brightness pixels can directly be extracted based on the brightness values of pixels constituting a digital image P.

The function of the image processing unit 30 according to the above embodiments can be realized by dedicated hardware or a conventional computer system.

The programs stored in the auxiliary storage 30c of the image processing unit 30 in the above Embodiment 2 can be stored and distributed on a computer readable recording medium such as a flexible disk, CD-ROM (compact disk read-only memory), DVD (digital versatile disk), and MO (magneto-optical disk) and installed on a computer to constitute an apparatus executing the above processing.

Alternatively, the programs can be stored in a disk device or the like of a given server unit on a communication network such as the Internet and downloaded to a compute by superimposing them on carrier waves.

Alternatively, the programs can be activated and executed while being transferred via communication networks.

Furthermore, it is possible to execute all or some of the programs on a server unit and execute the above image processing while transmitting/receiving information regarding the processing via communication networks.

For realizing the above functions by apportionment of an OS (operation system) or by cooperation of an OS and application programs, only the parts other than the OS can be stored and distributed on a recording medium or downloaded to a computer.

Various embodiments and modifications of the present invention are available without departing from the broad spirit and scope of the present invention. The above embodiments are given for explaining the present invention and do not confine the scope of the present invention. The scope of the present invention is defined by the scope of claims, not the embodiments. Various modifications made within the scope of claims and within the scope of significance of the present invention equivalent to the claims are considered to fall under the scope of the present invention.

The present application is based on the Japanese Patent Application No. 2009-012422 filed on Jan. 22, 2009, of which the specification, scope of claims, and figures are all incorporated herein by reference.

Industrial Applicability

The image processing apparatus, image processing method, and recording medium of the present invention are suitable for identifying a noise region contained in an iris image. Furthermore, the biometric authentication apparatus of the present invention is suitable for authentication by the iris pattern.

LEGEND 1, 2 biometric authentication apparatus
10 imaging unit
30 image processing unit
30a CPU
30b main storage
30c auxiliary storage
30d display part
30e input part
30f interface part
30g system bus
31 low brightness pixel extraction part
32 granting part
33 reference pixel setting part
34 pupil center position identifying part
35 region setting part
36 iris pattern identifying part
37 noise region identifying part
37a calculation part
37b position identifying part
50 matching unit
P digital image
P1 image
P2 binary image
P3 image
PX pixel
$PX_0$ reference pixel
PG1 low brightness pixel group
PG2 high brightness pixel group F1, F2 region
A1 to A8 annular region
AR1, AR2 arc
C, Cq circle
NA nose region
MA matching region
SL1, SL2 characteristic curve

The invention claimed is:

1. An image processing apparatus for detecting noise in a digital image of an eye, comprising:
 a calculation part calculating the average brightness value of each of multiple pixels in said digital image overlapping with a curve having a shape substantially conforming to the rim of the eyelid of said eye at each position of said curve while moving said curve from near the center of the pupil of said eye to said eyelid on said digital image; and
 an identifying part identifying the position of noise contained in an image of said iris in said digital image based on the degree of change in said average brightness value at said position.

2. The image processing apparatus according to claim 1, wherein said calculation part moves said curve from the center of said pupil or its vicinity to said eyelid.

3. The image processing apparatus according to claim 1, wherein said identifying part calculates a characteristic curve presenting the relationship between the position of said curve and said average brightness value and identifies the position of said noise based on the degree of change in the gradient of the characteristic curve.

4. The image processing apparatus according to claim 1, wherein said degree of change in the gradient is a differential value obtained by differentiating said characteristic curve at said position.

5. The image processing apparatus according to claim 1, wherein said curve is a curve similar to the rim of said eyelid.

6. The image processing apparatus according to claim 1, wherein said curve is a part of a circle having the center on a line parallel to the moving direction of said curve and overlapping with a pixel corresponding to the pupil in said digital image.

7. The image processing apparatus according to claim 1, wherein said curve has a curvature determined from the curvatures of the eyelids of multiple people that are measured in advance.

8. The image processing apparatus according to claim 1, wherein said eyelid includes at least one of the upper and lower eyelids.

9. A biometric authentication apparatus for authentication by the pattern of an iris, comprising:
 an imaging unit capturing a digital eye image; and
 the image processing apparatus according to claim 1 for identifying the position of noise contained in an image of said iris in said digital eye image.

10. An image processing method for detecting noise in a digital image of an eye, comprising:
 a step of calculating the average brightness value of each of multiple pixels in said digital image overlapping with a curve having a shape substantially conforming to the rim of the eyelid of said eye at each position of said curve while moving said curve from near the center of the pupil of said eye to said eyelid on said digital image; and
 a step of identifying the position of noise contained in a digital image of said iris in said digital image based on the degree of change in said average brightness value at said position.

11. A non-transitory computer readable recording medium on which recorded are programs that allow a computer to function as:
 a calculation means calculating the average brightness value of each of multiple pixels in a digital image of an eye overlapping with a curve having a shape substantially conforming to the rim of the eyelid of said eye at each position of said curve while moving said curve from near the center of the pupil of said eye to said eyelid on said digital eye image; and
 an identifying means identifying the position of noise contained in a digital image of said iris in said digital image based on the degree of change in said average brightness value at said position.

* * * * *